United States Patent
Ghosh et al.

(10) Patent No.: US 10,943,286 B1
(45) Date of Patent: Mar. 9, 2021

(54) DETERMINING PRODUCT ATTRIBUTE SEQUENCES USING QUANTITATIVE VALUES

(71) Applicant: Amazon Technologies, Inc., Seattle, WA (US)

(72) Inventors: Avik Ghosh, Bangalore (IN); Gokul Swamy, Bangalore (IN)

(73) Assignee: Amazon Technologies, Inc., Seattle, WA (US)

( * ) Notice: Subject to any disclaimer, the term of this patent is extended or adjusted under 35 U.S.C. 154(b) by 241 days.

(21) Appl. No.: 15/615,506

(22) Filed: Jun. 6, 2017

(51) Int. Cl.
  *G06Q 30/02* (2012.01)
  *G06Q 30/06* (2012.01)

(52) U.S. Cl.
  CPC ..... *G06Q 30/0633* (2013.01); *G06Q 30/0625* (2013.01); *G06Q 30/0631* (2013.01)

(58) Field of Classification Search
  None
  See application file for complete search history.

(56) References Cited

U.S. PATENT DOCUMENTS

| | | | | | |
|---|---|---|---|---|---|
| 2002/0169657 | A1* | 11/2002 | Singh | ..... | G06Q 10/06 705/7.31 |
| 2011/0047004 | A1* | 2/2011 | Bateni | ..... | G06Q 10/04 705/7.31 |
| 2011/0289026 | A1* | 11/2011 | Kannan | ..... | G06F 16/907 706/12 |
| 2012/0143883 | A1* | 6/2012 | Chen | ..... | G06F 16/958 707/751 |
| 2012/0303410 | A1* | 11/2012 | Connors | ..... | G06Q 30/02 705/7.31 |
| 2012/0303411 | A1* | 11/2012 | Chen | ..... | G06Q 10/087 705/7.31 |
| 2013/0275270 | A1* | 10/2013 | Wang | ..... | G06Q 30/0625 705/26.62 |
| 2014/0019448 | A1* | 1/2014 | Leonard | ..... | G06F 17/18 707/736 |
| 2014/0089340 | A1* | 3/2014 | Zhu | ..... | G06F 16/951 707/769 |
| 2014/0195348 | A1* | 7/2014 | Sun | ..... | G06Q 30/0256 705/14.54 |

(Continued)

*Primary Examiner* — Christopher J Raab
(74) *Attorney, Agent, or Firm* — Eversheds Sutherland (US) LLP

(57) ABSTRACT

Systems, methods, and computer-readable media are disclosed for determining product attribute sequences using quantitative values and predicting product performance. In one embodiment, an example method may include determining, by one or more computer processors coupled to at least one memory, a first textual product attribute value for a first product for which to predict product performance, the first product associated with a first product category, determining a first product demand model for the first product category, the first product demand model including at least one algorithm configured to output predicted product performance, determining a first numeric product attribute sequence for the first product using the first textual product attribute value and the first product demand model, the first numeric product attribute sequence including a first numeric product attribute value and a second numeric product attribute value, and determining a first textual product attribute sequence for the first product.

22 Claims, 7 Drawing Sheets

(56) References Cited

U.S. PATENT DOCUMENTS

| | | | |
|---|---|---|---|
| 2015/0134413 A1* | 5/2015 | Deshpande | G06Q 30/0202 705/7.31 |
| 2015/0186972 A1* | 7/2015 | Selvam | G06Q 30/0623 705/7.31 |
| 2016/0189177 A1* | 6/2016 | Parpia | G06Q 30/0202 705/7.31 |
| 2016/0357408 A1* | 12/2016 | Zavar | G06Q 30/0641 |

* cited by examiner

US 10,943,286 B1

DETERMINING PRODUCT ATTRIBUTE SEQUENCES USING QUANTITATIVE VALUES

BACKGROUND

Electronic devices may be used to browse and purchase products offered for sale at a webpage or in an application. Users may browse or purchase certain products while other products may not be browsed or purchased. Certain products may draw continued user interest throughout a time period, while user interest in other products may vary widely throughout the same time period. For example, certain clothing products may be purchased by users continuously throughout a year, while purchases of other clothing products may rise sharply and then decline within one or more months of the same year. In order to meet user needs, providers of clothing products may need to determine which clothing products to source throughout a time period and which clothing products to source during only a portion of the time period. Further, clothing product designers may desire to determine whether a new clothing product being developed may draw user interest throughout a time period or during only a portion of the time period. Using artificial intelligence to predict user interest in a particular clothing product over a time period or other characteristics may result in improved efficiency, improved sourcing of clothing products, and improved availability of such products for users as well as improved design of clothing products to meet the needs of users.

Figure 1A:
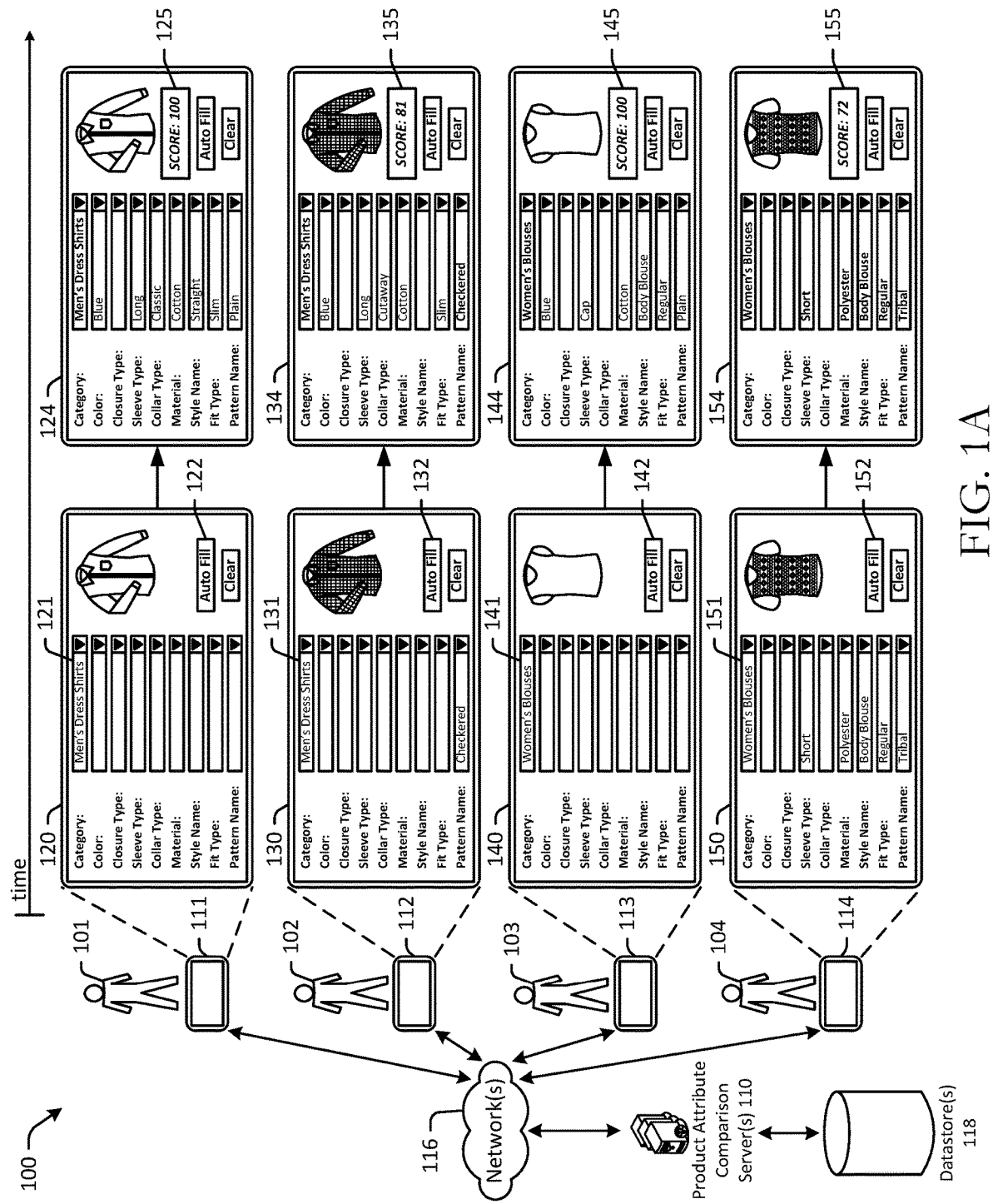
FIG. 1A is a hybrid system and user interface diagram illustrating determining product attribute sequences using quantitative values in accordance with one or more embodiments of the disclosure.

The detailed description is set forth with reference to the accompanying drawings. The drawings are provided for purposes of illustration only and merely depict example embodiments of the disclosure. The drawings are provided to facilitate understanding of the disclosure and shall not be deemed to limit the breadth, scope, or applicability of the disclosure. The use of the same reference numerals indicates similar, but not necessarily the same or identical components. Different reference numerals may be used to identify similar components. Various embodiments may utilize elements or components other than those illustrated in the drawings, and some elements and/or components may not be present in various embodiments. The use of singular terminology to describe a component or element may, depending on the context, encompass a plural number of such components or elements and vice versa.

DETAILED DESCRIPTION

Overview

Digital content may be presented at electronic devices, such that users of the electronic devices may consume or interact with the digital content. Content for delivery may include content such as text, images, videos, audio, and other content. Some content may include images of particular products as well as additional product related information. For example, certain content presented at a webpage or in an application may include images of a particular product offered for sale along with information related to the product offering, such as various product attributes for the product. Product attributes may include available colors, materials, styles, patterns, or other attributes of a particular product offered for sale. The product attributes for a particular product may influence a user decisions in purchasing the product. For example, a combination of product attributes may lead users to purchase a certain product, while another combination of product attributes may lead users to not purchase another product. In some instances, a combination of product attributes may lead users to purchase a certain product continuously throughout a particular time period, while another combination of product attributes may lead users to purchase another product during only a portion of the same time period.

For certain products, such as softlines products (e.g., clothing, footwear, and other accessory products, etc.), users may purchase some products continuously throughout a year or multiple years, while user interest in other products may exist for only a few months or a single season. As a result, certain challenges may arise for providers of softlines products, such as merchants, suppliers, or manufacturers, that need to source such products and/or product materials in an efficient manner. Additional challenges may exist for designers of softlines products that may desire to determine whether a new product being considered for production will draw user interest throughout an extended period of time or during only a short time period. Although providers and designers of softlines products may generally compare a particular product to other products having one or more similar attributes and/or an existing purchase history, it may be misleading to conclude that user interest in the product will be the same or even similar to that of the existing products. Indeed, differences in respective product attributes of two softlines products may result in markedly different performance in the marketplace. Accordingly, general comparisons based on one or more product attributes of a particular softlines product, while ignoring other product attributes, may be of limited value in predicting future performance of the product. As a result of these and other challenges in determining user interest in an existing or proposed softlines product, providers and designers of softlines products may struggle to satisfy user demand for or meet user interests in certain products.

Embodiments of the disclosure may predict future performance of an existing product, thereby allowing providers to source the product in an efficient manner. Further, embodiments of the disclosure may predict future performance of a proposed product, thereby allowing designers to determine whether the product is likely to meet user interests or whether certain changes should be made to one or more product attributes to maximize user interest. Certain embodiments may predict performance of a particular product based at least in part on product attribute sequences for existing products in the same product category. Some embodiments may determine a training set of product identifiers for a particular product category based at least in part on past performance of the product identifiers. For example, the training set may include product identifiers having at least a predetermined number of sales within a time period or at least a predetermined number of sales within each of multiple consecutive or separate time intervals of the time period. Some embodiments may determine a textual product attribute sequence for each product identifier of the training set. The textual product attribute sequence may include multiple text product attribute values for the respective product identifier. Some embodiments may convert the textual product attribute sequences to numeric product attribute sequences for the respective product identifiers of the training set. Each numeric product attribute sequence may include multiple numeric product attribute values for the respective product identifier. Some embodiments may determine a rate of sale (e.g., a number of product units sold over a certain amount of time, etc.) of each product identifier of the training set over the time period. Some embodiments may generate a product demand model for the particular product category using the numeric product attribute sequences and the rates of sale. The product demand model may include one or more machine learning algorithms configured to output a predicted product performance. Some embodiments may receive one or more textual product attribute values for a particular product associated with the particular product category, and determine a numeric product attribute sequence for the particular product using the one or more textual product attribute values and the product demand model.

Some embodiments may determine an estimated demand score for the particular product using the product demand model and the numeric product attribute sequence. The estimated demand score may indicate a predicted demand for the particular product relative to the product identifiers of the training set. Some embodiments may determine a textual product attribute sequence for the particular product using the numeric product attribute sequence. For example, the numeric product attribute sequence may be converted to the textual product attribute sequence. The numeric product attribute sequence may include the one or more textual product attribute values and additional textual product attribute values for the particular product. Some embodiments may cause the respective textual product attribute values of the textual product attribute sequence to be presented to a user. The process of predicting future performance of existing or proposed products may be carried out for numerous products in various product categories, and the product demand models for the respective product categories may be updated to improve the performance predictions provided thereby.

As a result, embodiments of the disclosure may assist product providers in efficiently sourcing existing products offered for sale to users over a period of time. Further, embodiments of the disclosure may use artificial intelligence to allow product designers to more effectively develop new products that are likely to satisfy user interests. By generating a product demand model using attribute sequences for product identifiers of a training set associated with a particular product category and historical data relating to past performance of the product identifiers, performance predictions for a product associated with the particular product category may be reliably determined. In this manner, embodiments of the disclosure may minimize the challenges faced by providers or designers of products in determining user demand or user interest in a particular product.

This disclosure relates to, among other things, systems, methods, computer-readable media, techniques, and methodologies for determining product attribute sequences using quantitative values, which may include one or more machine learning models, predictive algorithms, and the like. Embodiments may determine a first textual product attribute value for a particular product for which to predict product performance. The product may be associated with a particular product category. Embodiments may determine a product demand model for the product category. The product demand model may include an algorithm configured to output predicted product performance. Embodiments may determine a numeric product attribute sequence for the product using the first textual product attribute value and the product demand model. The numeric product attribute sequence may include a first numeric product attribute value and a second numeric product attribute value. Embodiments may determine a textual product attribute sequence for the product using the numeric product attribute sequence. The textual product attribute sequence may include the first textual product attribute value and a second textual product attribute value. Embodiments may determine an estimated demand score for the product using the product demand model and the numeric product attribute sequence. Numerous product demand models may be generated and updated to provide improved product performance predictions.

Figure 1B:
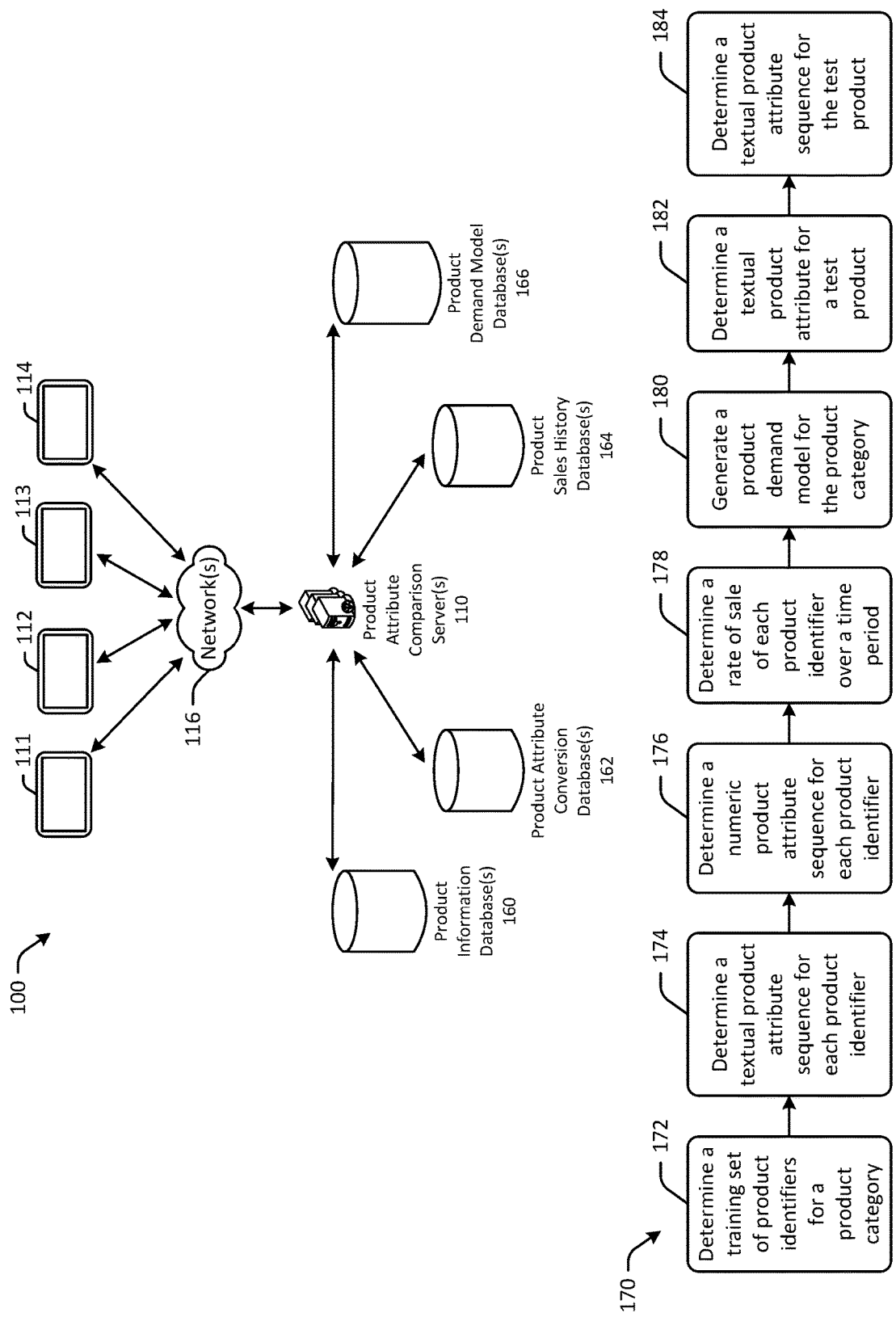
FIG. 1B is a hybrid system and process diagram illustrating determining product attribute sequences using quantitative values in accordance with one or more embodiments of the disclosure.

Referring to FIGS. 1A and 1B, an example system 100 illustrating determining product attribute sequences using quantitative values in accordance with one or more embodiments of the disclosure is depicted. The system 100 may include one or more servers and at least one or a plurality of user devices that connects to the server. In the example of FIG. 1A, one or more product attribute comparison servers 110 may be in communication with one or more user devices. Communication between the product attribute comparison server 110 and the one or more user devices may be facilitated by one or more networks. The one or more user devices may connect to or communicate with the product attribute comparison server 110, on a regular or irregular basis, to receive content, content delivery settings, product attribute sequences, product attribute values, and/or product performance predictions from the product attribute comparison server 110. The one or more user devices may be any type of electronic device used by a user to communicate with the product attribute comparison server 110 and receive content, content delivery settings, product attribute sequences, product attribute values, and/or product performance predictions from the product attribute comparison server 110.

In the example of FIGS. 1A and 1B, the product attribute comparison server 110 may be in communication with a first user device 111 associated with a first user 101, a second user device 112 associated with a second user 102, a third user device 113 associated with a third user 103, and a fourth user device 114 associated with a fourth user 104. Communication between the product attribute comparison server 110 and the user devices 111, 112, 113, 114 may be facilitated by one or more network(s) 116. The product attribute comparison server 110 may be in communication with and deliver content, such as product attribute sequences, product attribute values, and/or product performance predictions, to any number of user devices. The product attribute comparison server 110 may use a machine learning model to predict future performance of a particular product and/or determine product attributes for a particular product, for the users 101, 102, 103, 104 as well as other users in communication with the product attribute comparison server 110 by user devices. The product attribute comparison server 110 may be in communication with one or more datastore(s) 118 which may store product information, one or more product attribute conversion tools, historical data relating to product sales, one or more machine learning models, and other information accessible to the product attribute comparison server 110.

In FIG. 1A, the first user device 111 may connect to the one or more networks 111 and receive digital content for presentation at a first user interface 120. The digital content may be any suitable content, such as text, images, videos, audio, and other content. In some instances, the content may include multiple pieces of content for presentation at respective content delivery slots at a webpage or in an application. The digital content may include multiple pieces of content related to a type of product. In the example of FIG. 1A, the product type may be clothing products, and the content may include multiple pieces of content related to product attributes for clothing products. Example product attributes may include product category, color, closure type, sleeve type, collar type, material, style name, fit type, pattern name, and/or other product attributes. The digital content may include one or more selectable elements or other input fields related to respective product attributes of a product type. The one or more selectable elements may include a first selectable element 121 or other user input field for allowing a user to view one or more product attribute values for a first product attribute and to select one of the product attribute values. The first selectable element 121 may be a drop-down menu, although other types of selectable elements or user input fields may be used. In the example of FIG. 1A, the first selectable element 121 may relate to a product category attribute, and the first user interface 120 indicates that the first user 101 has selected the "Men's Dress Shirts" product category attribute value. Other product category attribute values may include "Men's Dress Pants," "Men's Sport Shirts," "Women's Blouses," "Women's Dresses," "Women's Skirts," and the like. The product attributes and respective product attribute values for each product attribute may be stored at the product attribute comparison server 110 or at a product information database 160 or other location accessible to the product attribute comparison server 110.

The one or more selectable elements may include additional selectable elements or other user input fields, in addition to the first selectable element 121, for allowing a user to view one or more product attribute values for other respective product attributes and to select respective product attribute values. In the example of FIG. 1A, the additional selectable elements may include a second selectable element related to a color attribute and allowing a user to select a color attribute value (e.g., "White," "Blue," etc.), a third selectable element related to a closure type attribute and allowing a user to select a closure type attribute value (e.g., "Button," "Zipper," etc.), a fourth selectable element related to a sleeve type attribute and allowing a user to select a sleeve type attribute value (e.g., "Long," "Short," etc.), a fifth selectable element related to a collar type attribute and allowing a user to select a collar type attribute value (e.g., "Classic," "Cutaway," etc.), a sixth selectable element related to a material attribute and allowing a user to select a material attribute value (e.g., "Cotton," "Polyester," etc.), a seventh selectable element related to a style name attribute and allowing a user to select a style name attribute value (e.g., "Straight," "Tapered," etc.), an eighth selectable element related to a fit type attribute and allowing a user to select a fit type attribute value (e.g., "Regular," "Slim," etc.), and a ninth selectable element related to a pattern name attribute and allowing a user to select a pattern name attribute value (e.g., "Plain," "Checkered," etc.). In some instances, the additional selectable elements may be displayed only after a user has selected a product category attribute value. In this manner, the additional selectable elements may relate to product attributes that are relevant to the selected product category attribute value. After selecting a product category attribute value, the user may select product attribute values for one, multiple, all, or none, of the additional product attributes. In the example of FIG. 1A, the first user 101 has selected the "Men's Dress Shirts" product category attribute value for the product category attribute and has not selected a product category attribute value for any of the additional product attributes.

The one or more selectable elements also may include a tenth selectable element 122 or other user input field for causing one or more product attribute values for one or more of the unselected product attributes to be automatically determined by the product attribute comparison server 110. The tenth selectable element 122 may be a selectable button, although other types of selectable elements may be used. As described below, the product attribute comparison server 110 may determine one or more product attribute values for one or more of the unselected product attributes such that a resulting product attribute sequence corresponds to a product that has the product attribute value(s) selected by the user and has a highest-ranking predicted performance of all potential products having the product attribute value(s) selected by the user. In other words, the product attribute comparison server 110 may determine one or more product attribute values for one or more of the unselected product attributes such that a resulting product attribute sequence corresponds to a product that matches the user's selection(s) and has a predicted performance that is equal to or greater than predicted performance for all other potential products having product attribute sequences corresponding to respective products that match the user's selection(s). In this manner, the product attribute comparison server 110 may assist a user, such as a product designer, in determining a product attribute sequence for a new product that matches the user's selections and is most likely to meet user interests. In the example of FIG. 1A, the first user 101 may select the tenth selectable element 122 after selecting the "Men's Dress Shirts" product category attribute value and without selecting a product attribute value for any of the additional product attributes. Selection of the tenth selectable element 122 may present a second user interface 124.

The second user interface 124 may include digital content related to a product attribute sequence determined by the product attribute comparison server 110. As described below, the product attribute sequence may be determined based at least in part on the product attribute value(s) selected by the user and a product demand model for the relevant product category. Product demand models for respective product categories may be stored at the product attribute comparison server 110 or at a product demand model database 166 or other location accessible to the product attribute comparison server 110. The digital content presented at the second user interface 124 may include multiple pieces of content related to product attributes for a product determined by the product attribute comparison server 110. In the example of FIG. 1A, the content may include a first content element related to a product category attribute of the product, a second content element related to a color attribute of the product, a third content element related to a closure type attribute of the product, a fourth content element related to a sleeve type attribute of the product, a fifth content element related to a collar type attribute of the product, a sixth content element related to a material attribute of the product, a seventh content element related to a style name attribute of the product, an eighth content element related to a fit type attribute of the product, and a ninth content element related to a pattern name attribute of the product. One or more of the content elements may include a textual product attribute value for the respective product attribute. In the example of FIG. 1A, the first content element may include a product category attribute value of "Men's Dress Shirts," the second content element may include a color attribute value of "Blue," the fourth content element may include a sleeve type attribute value of "Long," the fifth content element may include a collar type attribute value of "Classic," the sixth content element may include a material attribute value of "Cotton," the seventh content element may include a style name attribute value of "Straight," the eighth content element may include a fit type attribute value of "Slim," and the ninth content element may include a pattern name attribute value of "Plain." In some instances, the product attribute value(s) selected by a user may be indicated by bold text, and product attribute values determined by the product attribute comparison server 110 may be indicated by standard text. One or more of the content elements may not include a textual product attribute value for the respective product attribute. Such content elements may be empty or blank. In the example of FIG. 1A, the second content element relating to the closure type attribute may not include a textual product attribute value. In some instances, these content elements may be selectable elements, such as drop-down menus, although other types of selectable elements or user input fields may be used. In this manner, a user may select one or more of the selectable elements to view other product attribute values for the respective product attribute and/or to select a different product attribute value than that determined by the product attribute comparison server 110. In some embodiments, these content elements may be display elements that are not selectable by a user.

The digital content presented at the second user interface 124 also may include one or more pieces of content related to predicted performance of the product determined by the product attribute comparison server 110. In the example of FIG. 1A, the content may include a tenth content element 125 related to an estimated demand score for the product determined by the product attribute comparison server 110. As described below, the estimated demand score may correspond to a predicted user demand for the product relative to product identifiers of a training set used by the product attribute comparison server 110 to generate the product demand model for the product category. In some instances, the estimated demand score may be a numeric value within a predetermined range. In the example of FIG. 1A, the predetermined range may be from zero to 100, and the estimated demand score for the product determined by the product attribute comparison server 110 may be 100. In this manner, the estimated demand score may indicate that the product determined by the product attribute comparison server 110 may have a highest-ranking predicted performance of all potential products associated with the selected product category. Upon reviewing the product attribute values determined by the product attribute comparison server 110, the first user 101 may modify one or more of the product attribute values for one or more of the product attributes to cause the product attribute comparison server 110 to determine a product attribute sequence and an estimated demand score for another product based at least in part on the modified product attribute value(s) selected by the first user 101. In this manner, the first user 101 may select various combinations of product attributes and compare the product attribute sequences and estimated demand scores for the respective products determined by the product attribute comparison server 110.

In a similar manner, the second user device 112 may connect to the one or more networks 116 and receive digital content for presentation at a first user interface 130. The first user interface 130 may be similar to the first user interface 120, but the second user 102 may interact with the content in a different manner. The digital content may include multiple selectable elements related to respective product attributes of a product type. The one or more selectable elements may include a first selectable element 131 or other user input field for allowing a user to view one or more product attribute values for a first product attribute and to select one of the product attribute values. In the example of FIG. 1A, the first selectable element 131 may relate to a product category attribute, and the first user interface 130 may indicate that the second user 102 has selected a product category attribute value of "Men's Dress Shirts." An additional selectable element may relate to a pattern name attribute, and the first user interface 130 may indicate that the second user 102 has selected a pattern name attribute value of "Checkered." In the example of FIG. 1A, the second user 102 may select a tenth selectable element 132 after selecting the "Men's Dress Shirts" product category attribute value and the "Checkered" pattern name attribute value and without selecting a product attribute value for any of the remaining product attributes. Selection of the tenth selectable element 132 may present a second user interface 134.

The second user interface 134 may include digital content related to a product attribute sequence determined by the product attribute comparison server 110. In the example of FIG. 1A, a first content element may include a product category attribute value of "Men's Dress Shirts," a second content element may include a color attribute value of "Blue," a fourth content element may include a sleeve type attribute value of "Long," a fifth content element may include a collar type attribute value of "Cutaway," a sixth content element may include a material attribute value of "Cotton," an eighth content element may include a fit type attribute value of "Slim," and a ninth content element may include the pattern name attribute value of "Checkered." In some instances, the product attribute values selected by the second user 102 may be indicated by bold text, and product attribute values determined by the product attribute comparison server 110 may be indicated by standard text. The digital content presented at the second user interface 134 also may include one or more pieces of content related to predicted performance of the product determined by the product attribute comparison server 110. In the example of FIG. 1A, the content may include a tenth content element 135 related to an estimated demand score for the product determined by the product attribute comparison server 110. In the example of FIG. 1A, the estimated demand score for the product determined by the product attribute comparison server 110 may be 81. In this manner, the estimated demand score may indicate that the product determined by the product attribute comparison server 110 may have a highest-ranking predicted performance of all potential products associated with the selected pattern name attribute value and product category, but that the product does not have the highest-ranking predicted performance of all potential products associated with the selected product category.

In a similar manner, the third user device 113 may connect to the one or more networks 116 and receive digital content for presentation at a first user interface 140. The first user interface 140 may be similar to the first user interface 120, but the third user 103 may interact with the content in a different manner. The digital content may include multiple selectable elements related to respective product attributes of a product type. The one or more selectable elements may include a first selectable element 141 or other user input field for allowing a user to view one or more product attribute values for a first product attribute and to select one of the product attribute values. In the example of FIG. 1A, the first selectable element 141 may relate to a product category attribute, and the first user interface 140 may indicate that the third user 103 has selected a product category attribute value of "Women's Blouses." In the example of FIG. 1A, the third user 103 may select a tenth selectable element 142 after selecting the "Women's Blouses" product category attribute value and without selecting a product attribute value for any of the remaining product attributes. Selection of the tenth selectable element 142 may present a second user interface 144.

The second user interface 144 may include digital content related to a product attribute sequence determined by the product attribute comparison server 110. In the example of FIG. 1A, a first content element may include a product category attribute value of "Women's Blouses," a second content element may include a color attribute value of "Blue," a fourth content element may include a sleeve type attribute value of "Cap," a sixth content element may include a material attribute value of "Cotton," a seventh content element may include a style name attribute of "Body Blouse," an eighth content element may include a fit type attribute value of "Regular," and a ninth content element may include the pattern name attribute value of "Plain." In some instances, the product attribute values selected by the third user 103 may be indicated by bold text, and product attribute values determined by the product attribute comparison server 110 may be indicated by standard text. The digital content presented at the second user interface 144 also may include one or more pieces of content related to predicted performance of the product determined by the product attribute comparison server 110. In the example of FIG. 1A, the content may include a tenth content element 145 related to an estimated demand score for the product determined by the product attribute comparison server 110. In the example of FIG. 1A, the estimated demand score for the product determined by the product attribute comparison server 110 may be 100. In this manner, the estimated demand score may indicate that the product determined by the product attribute comparison server 110 may have a highest-ranking predicted performance of all potential products associated with the selected product category.

In a similar manner, the fourth user device 114 may connect to the one or more networks 116 and receive digital content for presentation at a first user interface 150. The first user interface 150 may be similar to the first user interface 120, but the fourth user 104 may interact with the content in a different manner. The digital content may include multiple selectable elements related to respective product attributes of a product type. The one or more selectable elements may include a first selectable element 151 or other user input field for allowing a user to view one or more product attribute values for a first product attribute and to select one of the product attribute values. In the example of FIG. 1A, the first selectable element 151 may relate to a product category attribute, and the first user interface 150 may indicate that the fourth user 104 has selected a product category attribute value of "Women's Blouses." Additional selectable elements may relate to a sleeve type attribute, a material attribute, a style name attribute, a fit type attribute, and a pattern name attribute, and the first user interface 150 may indicate that the fourth user 104 has selected a sleeve type attribute value of "Short," a material attribute value of "Polyester," a style name attribute value of "Body Blouse," a fit type attribute value of "Regular," and a pattern name attribute value of "Tribal." In the example of FIG. 1A, after selecting these product attribute values and without selecting a product attribute value for any of the remaining product attributes, the fourth user 104 may select a tenth selectable element 152. Selection of the tenth selectable element 152 may present a second user interface 154.

The second user interface 154 may include digital content related to a product attribute sequence determined by the product attribute comparison server 110. In the example of FIG. 1A, a first content element may include the product category attribute value of "Women's Blouses," a fourth content element may include the sleeve type attribute value of "Short," a sixth content element may include the material attribute value of "Polyester," a seventh content element may include the style name attribute value of "Body Blouse," an eighth content element may include the fit type attribute value of "Regular," and a ninth content element may include the pattern name attribute value of "Tribal." In some instances, the product attribute values selected by the fourth user 104 may be indicated by bold text, and product attribute values determined by the product attribute comparison server 110 may be indicated by standard text. In the example of FIG. 1A, the product attribute comparison server 110 has not determined any product attribute values in addition to those selected by the fourth user 104. The digital content presented at the second user interface 154 also may include one or more pieces of content related to predicted performance of the product determined by the product attribute comparison server 110. In the example of FIG. 1A, the content may include a tenth content element 155 related to an estimated demand score for the product determined by the product attribute comparison server 110. In the example of FIG. 1A, the estimated demand score for the product determined by the product attribute comparison server 110 may be 72. In this manner, the estimated demand score may indicate that the product determined by the product attribute comparison server 110 may have a highest-ranking predicted performance of all potential products associated with the selected pattern name attribute value and product category, but that the product does not have the highest-ranking predicted performance of all potential products associated with the selected product category.

To determine a product attribute sequence and predicted product performance for a particular product based at least in part on one or more product attribute values provided by a user, such as the first user 101, the second user 102, the third user 103, or the fourth user 104, the product attribute comparison server 110 may execute one or more process flows. For example, an example process flow 170 for determining product attribute sequences using quantitative values is depicted in FIG. 1B.

At block 172 of the process flow 170, the product attribute comparison server 110 may determine a training set of product identifiers for a product category. The training set may include a first product identifier, a second product identifier, and one or more additional product identifiers. The training set may include any number of product identifiers. The training set may be determined by identifying product identifiers associated with the product category and having at least a predetermined number of sales within a time period or at least a predetermined number of sales within each of multiple consecutive time intervals of the time period. In some instances, the predetermined number of sales may be one sale, 100 sales, or any number of sales. In some instances, the time period may be a period of one month, six months, or another multi-month period. In some instances, the time period may be a period of eighteen months, and each time interval may be six months.

At block 174 of the process flow 170, the product attribute comparison server 110 may determine a textual product attribute sequence for each product identifier of the training set. Each textual product attribute sequence may include a first textual product attribute value and a second textual product attribute value. In some instances, the textual product attribute sequence may include, in addition to the first textual product attribute value and the second textual product attribute value, a third textual product attribute value or any number of textual product attribute values. Each textual product attribute value may correspond to a product attribute of the respective products or product identifiers.

At block 176 of the process flow 170, the product attribute comparison server 110 may determine a numeric product attribute sequence for each product identifier of the training set. Each numeric product attribute sequence may include a first numeric product attribute value and a second numeric product attribute value. In some instances, the numeric product attribute sequence may include, in addition to the first numeric product attribute value and the second numeric product attribute value, a third numeric product attribute value or any number of numeric product attribute values. Each numeric product attribute value may correspond to a product attribute of the respective product identifier. In some instances, the numeric product attribute sequence may be determined using the textual product attribute sequence and a product attribute conversion tool, such as a conversion dictionary. In some instances, the numeric product attribute sequence may be a bag-of-words representation corresponding to the textual product attribute sequence, and the textual product attribute sequence may be converted to the numeric product attribute sequence using a bag-of-words dictionary.

At block 178 of the process flow 170, the product attribute comparison server 110 may determine a rate of sale of each product identifier of the training set over a time period. In some instances, the time period may be one month, six months, or eighteen months. In some instances, the time period may be the same as a time period used to determine the product identifiers of the training set. In some instances, the rates of sale of the respective product identifiers over the time period may be determined using historical sales data stored at the product attribute comparison server or at a product sales history database or other location accessible to the product attribute comparison server.

At block 180 of the process flow 170, the product size recommendation server 110 may generate a product demand model for the product category using the numeric product attribute sequences and the rates of sale of the product identifiers of the training set. The product demand model may include at least one algorithm. The product demand model may be a machine learning model. The product demand model may include multiple algorithms configured to output predicted product performance.

At block 182 of the process flow 170, the product size recommendation server 110 may determine one or more textual product attribute values for a test product for which to predict product performance, the test product being associated with the product category. In some instances, the test product may be a softlines product, such as a clothing product, a footwear product, or other accessory product. In some instances, the test product may be an existing product or a new product for which a user, such as a provider of the product, desires to determine estimated product performance, such as expected sales, expected user interest, expected velocity, expected inventory levels, and the like. In some instances, the test product may be a proposed product for which a user, such as a designer of the product, needs to determine estimated product performance. The one or more textual product attribute values for the test product may be determined by the user and received by the product size recommendation server 110.

At block 184 of the process flow 170, the product size recommendation server 110 may determine a textual product attribute sequence for the test product. The product size recommendation server 110 may determine the textual product attribute sequence for the test product using the one or more textual product attribute values determined by the user and the product demand model. The textual product attribute sequence may include the one or more textual product attribute values determined by the user and one or more textual product attribute values determined by the product size recommendation server 110. In some instances, the product size recommendation server 110 may cause the textual product attribute sequence to be presented to the user at a display device. In some instances, the product size recommendation server 110 may determine an estimated demand score using the textual product attribute sequence and the product demand model. The estimated demand score may be a numeric value corresponding to a predicted performance of the test product relative to predicted performance of the product identifiers of the training set. In some instances, the product size recommendation server 110 may cause the estimated demand score to be presented to the user at a display device.

By implementing the process of determining a training set of product identifiers for a product category, determining a textual product attribute sequence for each product identifier of the training set, determining a numeric product attribute sequence for each product identifier of the training set, determining a rate of sale of each product identifier of the training set over a time period, generating a product demand model for the product category, determining one or more textual product attribute values for a test product, and determining a textual product attribute sequence for the test product, embodiments of the disclosure may assist particular users in determining predicted performance of products based at least in part on past performance of products in the same product category.

Example embodiments of the disclosure provide a number of technical features or technical effects. For example, in accordance with example embodiments of the disclosure, certain embodiments of the disclosure may generate artificial intelligence, including a product demand model for a product category in one example, using a training set of product identifiers associated with the product category. As a result, the product demand model may be used to predict product performance for products associated with the product category. Embodiments of the disclosure may determine a textual product attribute sequence for a product using one or more textual product attribute values determined by a user and a product demand model for a respective product category. As a result, users may identify certain product attribute combinations that may maximize performance of the product. The above examples of technical features and/or technical effects of example embodiments of the disclosure are merely illustrative and not exhaustive.

One or more illustrative embodiments of the disclosure have been described above. The above-described embodiments are merely illustrative of the scope of this disclosure and are not intended to be limiting in any way. Accordingly, variations, modifications, and equivalents of embodiments disclosed herein are also within the scope of this disclosure. The above-described embodiments and additional and/or alternative embodiments of the disclosure will be described in detail hereinafter through reference to the accompanying drawings.

Illustrative Processes and Use Cases

Figure 2:
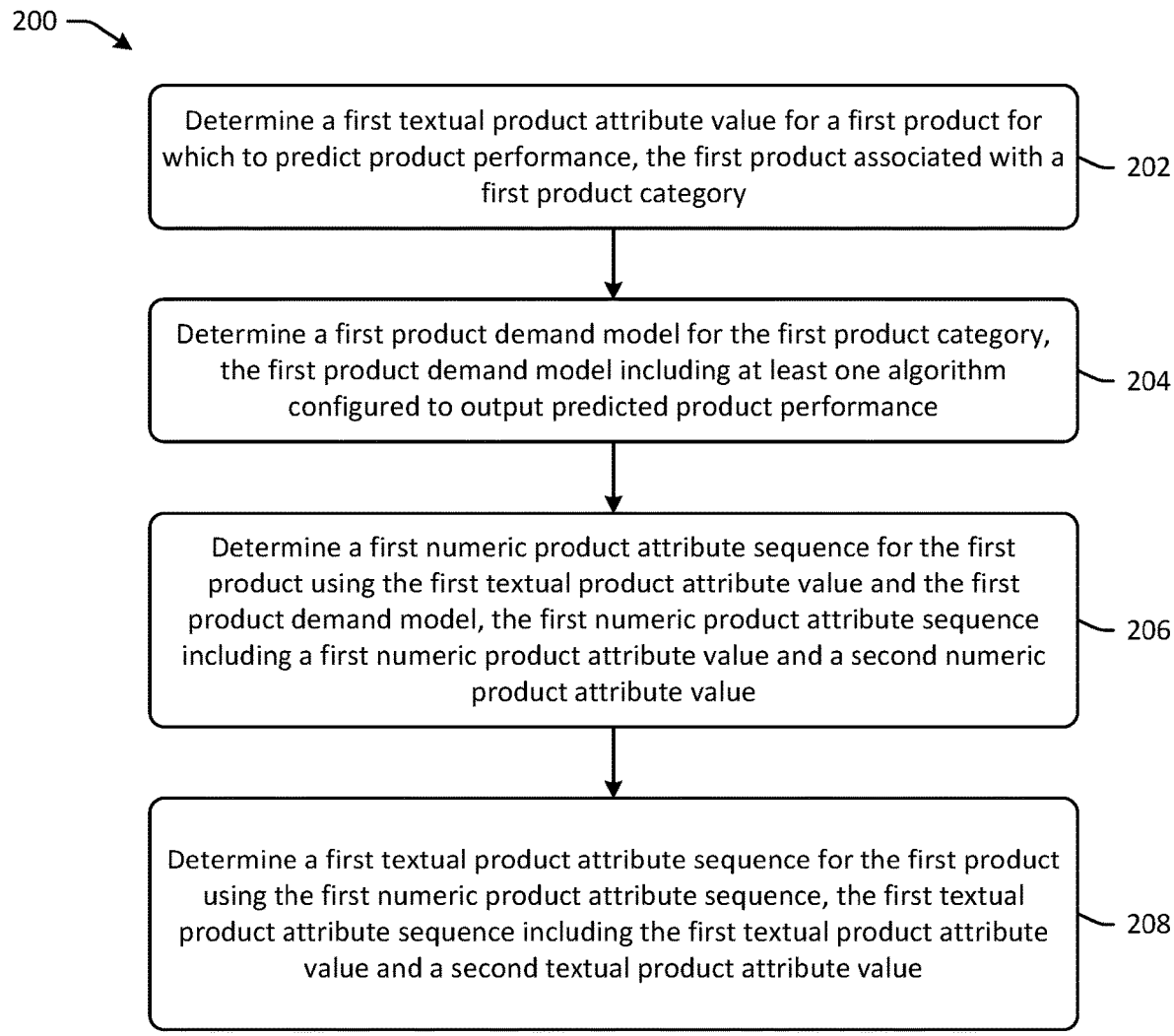
FIG. 2 is an example process flow diagram for determining product attribute sequences using quantitative values in accordance with one or more embodiments of the disclosure.

Referring to FIG. 2, an example process flow 200 for determining product attribute sequences using quantitative values in accordance with one or more embodiments of the disclosure is depicted. Although certain operations are illustrated as occurring separately in FIG. 2, some or all of the operations may occur concurrently or partially concurrently across one or more computer systems. In some embodiments, the operations of the process flow 200 may be executed by a remote server, such as a product attribute comparison server.

At block 202 of the process flow 200, a first textual product attribute value for a first product for which to predict product performance may be determined, the first product associated with a first product category. For example, computer-executable instructions of one or more product attribute comparison module(s) stored at a server may be executed to determine a first textual product attribute value for a first product for which to predict product performance. The first product may be associated with a first product category. In some embodiments, a server, such as a product attribute comparison server, may determine a first textual product attribute value for a first product for which to predict product performance. In some instances, the first product may be a softlines product, such as a clothing product, a footwear product, or other accessory product. In some instances, the first product may be an existing product or a new product for which a user, such as a provider of the product, needs to determine estimated product performance. In some instances, the first product may be a proposed product for which a user, such as a designer of the product, needs to determine estimated product performance.

At block 204 of the process flow 200, a first product demand model for the first product category may be determined, the first product demand model including at least one algorithm configured to output predicted product performance. For example, computer-executable instructions of one or more product attribute comparison module(s) stored at a server may be executed to determine a first product demand model for the first product category. The first product demand model may include at least one algorithm configured to output predicted product performance. The first product demand model may be a machine learning model. The first product demand model may include multiple algorithms configured to output predicted product performance. In some embodiments, a server, such as a product attribute comparison server, may determine a first product demand model for the first product category.

At block 206 of the process flow 200, a first numeric product attribute sequence for the first product may be determined using the first textual product attribute value and the first product demand model, the first numeric product attribute sequence including a first numeric product attribute value and a second numeric product attribute value. For example, computer-executable instructions of one or more product attribute comparison module(s) stored at a server may be executed to determine a first numeric product attribute sequence for the first product using the first textual product attribute value and the first product demand model. The first numeric product attribute sequence may include a first numeric product attribute value and a second numeric product attribute value. In some instances, the first numeric product attribute sequence may include, in addition to the first numeric product attribute value and the second numeric product attribute value, a third numeric product attribute value or any number of numeric product attribute values. In some embodiments, a server, such as a product attribute comparison server, may determine a first numeric product attribute sequence for the first product using the first textual product attribute value and the first product demand model.

At block 208 of the process flow 200, a first textual product attribute sequence for the first product may be determined using the first numeric product attribute sequence, the first textual product attribute sequence including the first textual product attribute value and a second textual product attribute value. For example, computer-executable instructions of one or more product attribute comparison module(s) stored at a server may be executed to determine a first textual product attribute sequence for the first product using the first numeric product attribute sequence. The first textual product attribute sequence may include the first textual product attribute value and a second textual product attribute value. In some instances, the first textual product attribute sequence may include, in addition to the first textual product attribute value and the second textual product attribute value, a third textual product attribute value or any number of textual product attribute values. In some embodiments, a server, such as a product attribute comparison server, may determine a first textual product attribute sequence for the first product using the first numeric product attribute sequence.

Figure 3:
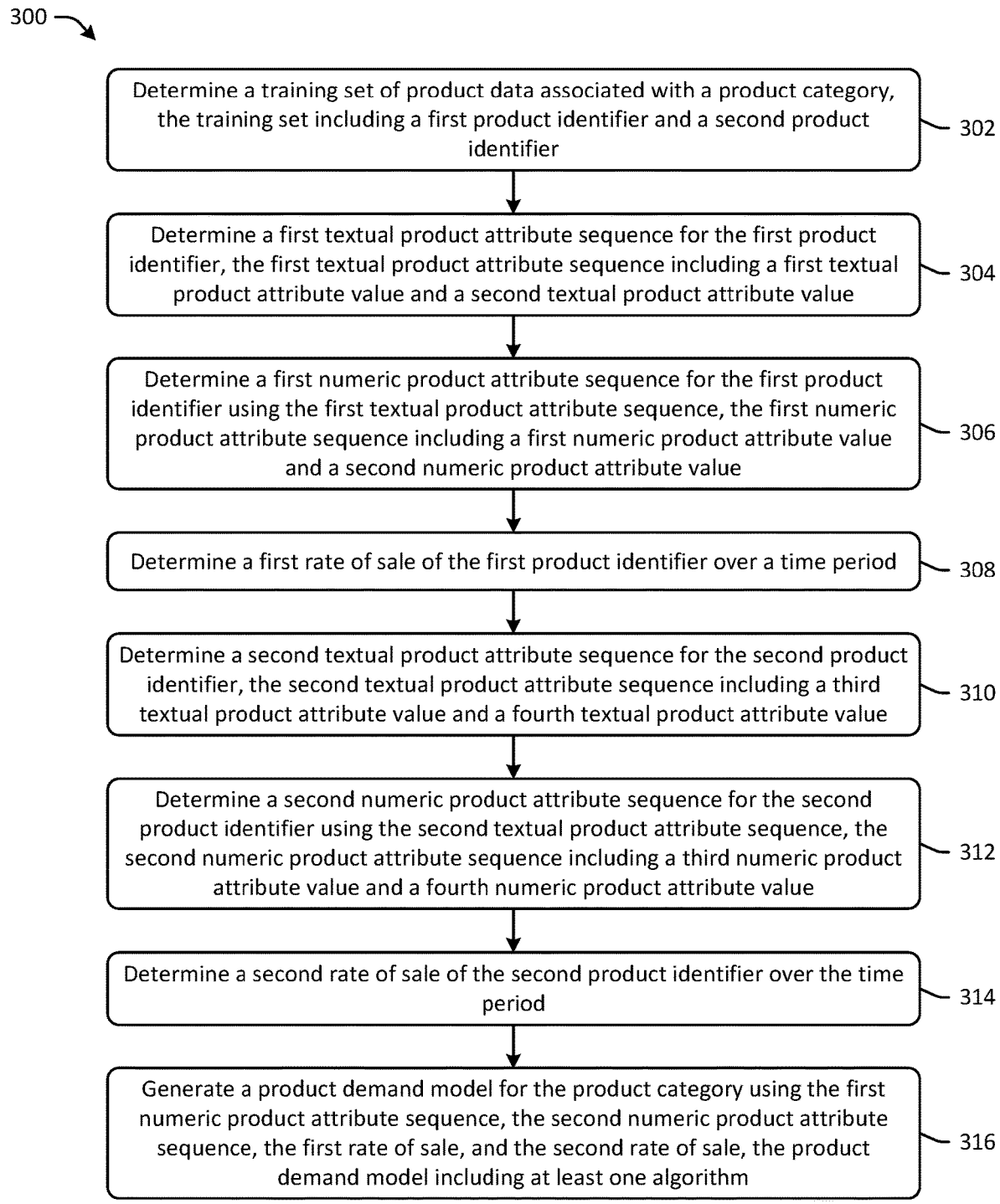
FIG. 3 is an example process flow diagram for generating a product demand model for a particular product category in accordance with one or more embodiments of the disclosure.

FIG. 3 depicts an example process flow 300 for generating a product demand model for a particular product category is depicted. Although certain operations are illustrated as occurring separately in FIG. 3, some or all of the operations may occur concurrently or partially concurrently across one or more computer systems. In some embodiments, the operations of the process flow 300 may be executed by a remote server, such as a product attribute comparison server.

At block 302 of the process flow 300, a training set of product data associated with a product category may be determined, the training set including a first product identifier and a second product identifier. For example, computer-executable instructions of one or more product attribute comparison module(s) stored at a server may be executed to determine a training set of product data associated with a product category. The training set may include a first product identifier and a second product identifier. In some instances, the training set may include, in addition to the first product identifier and the second product identifier, a third product identifier or any number of product identifiers. The training set may be determined by identifying product identifiers associated with the product category and having at least a predetermined number of sales within a time period or at least a predetermined number of sales within each of multiple consecutive time intervals of the time period. In some instances, the predetermined number of sales may be one sale, 100 sales, or any other threshold number of sales. In some instances, the time period may be a period of one month, six months, or another multi-month period. In some instances, the time period may be a period of eighteen months, and each time interval may be six months. In some embodiments, a server, such as a product attribute comparison server, may determine a training set of product data associated with a product category.

At block 304 of the process flow 300, a first textual product attribute sequence for the first product identifier may be determined, the first textual product attribute sequence including a first textual product attribute value and a second textual product attribute value. For example, computer-executable instructions of one or more product attribute comparison module(s) stored at a server may be executed to determine a first textual product attribute sequence for the first product identifier. The first textual product attribute sequence may include a first textual product attribute value and a second textual product attribute value. In some instances, the first textual product attribute sequence may include, in addition to the first textual product attribute value and the second textual product attribute value, a third textual product attribute value or any number of textual product attribute values. In some embodiments, a server, such as a product attribute comparison server, may determine a first textual product attribute sequence for the first product identifier.

At block 306 of the process flow 300, a first numeric product attribute sequence for the first product identifier may be determined using the first textual product attribute sequence, the first numeric product attribute sequence including a first numeric product attribute value and a second numeric product attribute value. For example, computer-executable instructions of one or more product attribute comparison module(s) stored at a server may be executed to determine a first numeric product attribute sequence for the first product identifier using the first textual product attribute sequence. The first numeric product attribute sequence may include a first numeric product attribute value and a second numeric product attribute value. In some instances, the first numeric product attribute sequence may include, in addition to the first numeric product attribute value and the second numeric product attribute value, a third numeric product attribute value or any number of numeric product attribute values. In some instances, the first numeric product attribute sequence may be determined using the first textual product attribute sequence and a product attribute conversion tool, such as a conversion dictionary. In some instances, the first numeric product attribute sequence may be a bag-of-words representation corresponding to the first textual product attribute sequence, and the first textual product attribute sequence may be converted to the first numeric product attribute sequence using a bag-of-words dictionary. In some embodiments, a server, such as a product attribute comparison server, may determine a first numeric product attribute sequence for the first product identifier using the first textual product attribute sequence.

At block 308 of the process flow 300, a first rate of sale of the first product identifier over a time period may be determined. For example, computer-executable instructions of one or more product attribute comparison module(s) stored at a server may be executed to determine a first rate of sale of the first product identifier over a time period. In some instances, the time period may be one month, six months, or eighteen months. In some instances, the time period may be the same as the time period used to determine the product identifiers of the training set. In some embodiments, a server, such as a product attribute comparison server, may determine a first rate of sale of the first product identifier over a time period. In some instances, the first rate of sale of the first product identifier over a time period may be determined using historical sales data stored at the product attribute comparison server or at a product sales history database or other location accessible to the product attribute comparison server.

At block 310 of the process flow 300, a second textual product attribute sequence for the second product identifier may be determined, the second textual product attribute sequence including a third textual product attribute value and a fourth textual product attribute value. For example, computer-executable instructions of one or more product attribute comparison module(s) stored at a server may be executed to determine a second textual product attribute sequence for the second product identifier. The second textual product attribute sequence may include a third textual product attribute value and a fourth textual product attribute value. In some instances, the second textual product attribute sequence may include, in addition to the third textual product attribute value and the fourth textual product attribute value, a fifth textual product attribute value or any number of textual product attribute values. In some embodiments, a server, such as a product attribute comparison server, may determine a second textual product attribute sequence for the second product identifier.

At block 312 of the process flow 300, a second numeric product attribute sequence for the second product identifier may be determined using the second textual product attribute sequence, the second numeric product attribute sequence including a third numeric product attribute value and a fourth numeric product attribute value. For example, computer-executable instructions of one or more product attribute comparison module(s) stored at a server may be executed to determine a second numeric product attribute sequence for the second product identifier using the second textual product attribute sequence. The second numeric product attribute sequence may include a third numeric product attribute value and a fourth numeric product attribute value. In some instances, the second numeric product attribute sequence may include, in addition to the third numeric product attribute value and the fourth numeric product attribute value, a fifth numeric product attribute value or any number of numeric product attribute values. In some instances, the second numeric product attribute sequence may be determined using the second textual product attribute sequence and a product attribute conversion tool, such as a conversion dictionary. In some instances, the second numeric product attribute sequence may be a bag-of-words representation corresponding to the second textual product attribute sequence, and the second textual product attribute sequence may be converted to the second numeric product attribute sequence using a bag-of-words dictionary. In some embodiments, a server, such as a product attribute comparison server, may determine a second numeric product attribute sequence for the second product identifier using the second textual product attribute sequence.

At block 314 of the process flow 300, a second rate of sale of the second product identifier over the time period may be determined. For example, computer-executable instructions of one or more product attribute comparison module(s) stored at a server may be executed to determine a second rate of sale of the second product identifier over the time period. In some embodiments, a server, such as a product attribute comparison server, may determine a second rate of sale of the second product identifier over the time period. In some instances, the second rate of sale of the second product identifier over the time period may be determined using historical sales data stored at the product attribute comparison server or at a product sales history database or other location accessible to the product attribute comparison server.

At block 316 of the process flow 300, a product demand model for the product category may be generated using the first numeric product attribute sequence, the second numeric product attribute sequence, the first rate of sale, and the second rate of sale, the product demand model including at least one algorithm, which may be a machine learning algorithm. For example, computer-executable instructions of one or more product attribute comparison module(s) stored at a server may be executed to generate a product demand model for the product category using the first numeric product attribute sequence, the second numeric product attribute sequence, the first rate of sale, and the second rate of sale. The product demand model may include at least one algorithm. The product demand model may be a machine learning model. The product demand model may include multiple algorithms configured to output predicted product performance. In some embodiments, a server, such as a product attribute comparison server, may generate a product demand model for the product category using the first numeric product attribute sequence, the second numeric product attribute sequence, the first rate of sale, and the second rate of sale.

Figure 4A:
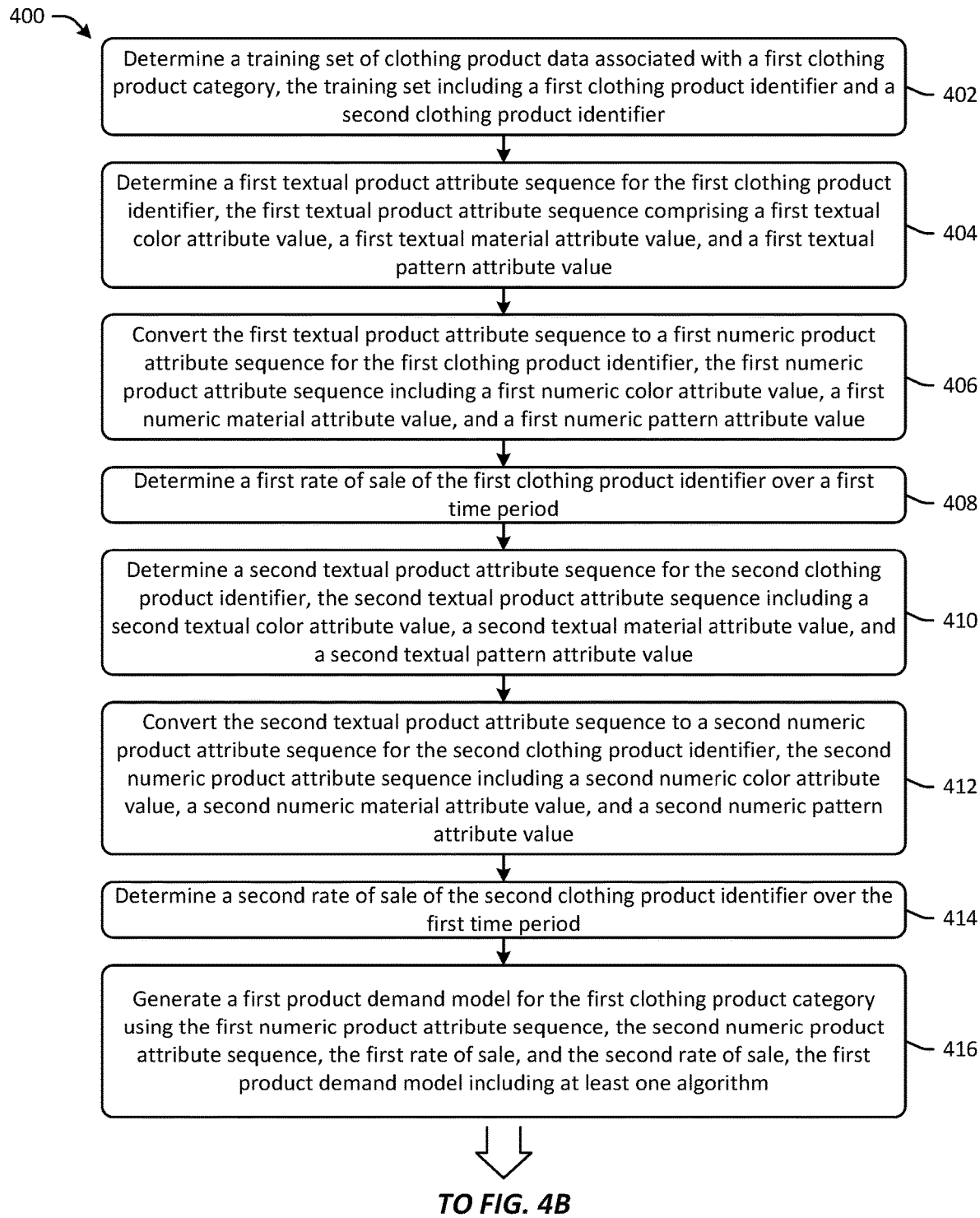
FIGS. 4A and 4B are an example process flow diagram for determining product attribute sequences using quantitative values in accordance with one or more embodiments of the disclosure.
Figure 4B:
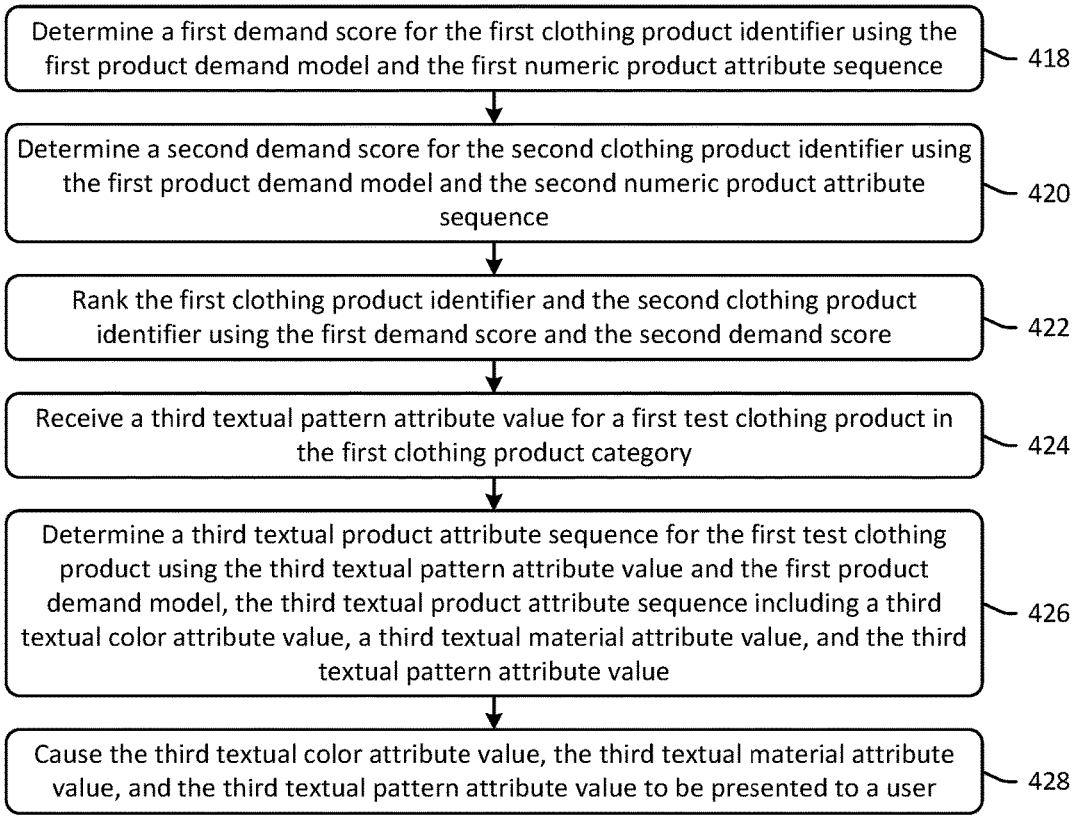

FIGS. 4A and 4B depict an example process flow 400 for determining product attribute sequences using quantitative values in accordance with one or more embodiments of the disclosure is depicted. Although certain operations are illustrated as occurring separately in FIGS. 4A and 4B, some or all of the operations may occur concurrently or partially concurrently across one or more computer systems. In some embodiments, the operations of the process flow 400 may be executed by a remote server, such as a product attribute comparison server.

At block 402 of the process flow 400, a training set of clothing product data associated with a first clothing product category may be determined, the training set including a first clothing product identifier and a second clothing product identifier. For example, computer-executable instructions of one or more product attribute comparison module(s) stored at a server may be executed to determine a training set of clothing product data associated with a first clothing product category. The training set may include any number of clothing product identifiers associated with the first clothing product category. In some embodiments, a server, such as a product attribute comparison server, may determine first user information for a first user.

At block 404 of the process flow 400, a first textual product attribute sequence for the first clothing product identifier may be determined, the first textual product attribute sequence including a first textual color attribute value, a first textual material attribute value, and a first textual pattern attribute value. For example, computer-executable instructions of one or more product attribute comparison module(s) stored at a server may be executed to determine a first textual product attribute sequence for the first clothing product identifier. The first textual product attribute sequence may include any number of textual product attribute values. In some embodiments, a server, such as a product attribute comparison server, may determine a first textual product attribute sequence for the first clothing product identifier.

At block 406 of the process flow 400, the first textual product attribute sequence may be converted to a first numeric product attribute sequence for the first clothing product identifier, the first numeric product attribute sequence including a first numeric color attribute value, a first numeric material attribute value, and a first numeric pattern attribute value. For example, computer-executable instructions of one or more product attribute comparison module(s) stored at a server may be executed to convert the first textual product attribute sequence to a first numeric product attribute sequence for the first clothing product identifier. The first numeric product attribute sequence may include any number of numeric product attribute values. The first numeric product attribute sequence may be a bag-of-words representation corresponding to the first textual product attribute sequence, and the first textual product attribute sequence may be converted to the first numeric product attribute sequence using a product attribute conversion tool, such as a bag-of-words dictionary. In some embodiments, a server, such as a product attribute comparison server, may convert the first textual product attribute sequence to a first numeric product attribute sequence for the first clothing product identifier.

At block 408 of the process flow 400, a first rate of sale of the first clothing product identifier over a first time period may be determined. For example, computer-executable instructions of one or more product attribute comparison module(s) stored at a server may be executed to determine a first rate of sale of the first clothing product identifier over a first time period. The first time period may be the same as a time period used to determine the training set of clothing product data. In some embodiments, a server, such as a product attribute comparison server, may determine a first rate of sale of the first clothing product identifier over a first time period.

At block 410 of the process flow 400, a second textual product attribute sequence for the second clothing product identifier may be determined, the second textual product attribute sequence including a second textual color attribute value, a second textual material attribute value, and a second textual pattern attribute value. For example, computer-executable instructions of one or more product attribute comparison module(s) stored at a server may be executed to determine a second textual product attribute sequence for the second clothing product identifier. The second textual product attribute sequence may include any number of textual product attribute values. In some embodiments, a server, such as a product attribute comparison server, may determine a second textual product attribute sequence for the second clothing product identifier.

At block 412 of the process flow 400, the second textual product attribute sequence may be converted to a second numeric product attribute sequence for the second clothing product identifier, the second numeric product attribute sequence including a second numeric color attribute value, a second numeric material attribute value, and a second numeric pattern attribute value. For example, computer-executable instructions of one or more product attribute comparison module(s) stored at a server may be executed to convert the second textual product attribute sequence to a second numeric product attribute sequence for the second clothing product identifier. The second numeric product attribute sequence may include any number of numeric product attribute values. The second numeric product attribute sequence may be a bag-of-words representation corresponding to the second textual product attribute sequence, and the second textual product attribute sequence may be converted to the second numeric product attribute sequence using a product attribute conversion tool, such as a bag-ofwords dictionary. In some embodiments, a server, such as a product attribute comparison server, may convert the second textual product attribute sequence to a second numeric product attribute sequence for the second clothing product identifier.

At block 414 of the process flow 400, a second rate of sale of the second clothing product identifier over the first time period may be determined. For example, computer-executable instructions of one or more product attribute comparison module(s) stored at a server may be executed to determine a second rate of sale of the second clothing product identifier over the first time period. In some embodiments, a server, such as a product attribute comparison server, may determine a second rate of sale of the second clothing product identifier over the first time period.

At block 416 of the process flow 400, a first product demand model for the first clothing product category may be generated using the first numeric product attribute sequence, the second numeric product attribute sequence, the first rate of sale, and the second rate of sale, the first product demand model including at least one algorithm. For example, computer-executable instructions of one or more product attribute comparison module(s) stored at a server may be executed to generate a first product demand model for the first clothing product category using the first numeric product attribute sequence, the second numeric product attribute sequence, the first rate of sale, and the second rate of sale. In some embodiments, a server, such as a product attribute comparison server, may generate a first product demand model for the first clothing product category using the first numeric product attribute sequence, the second numeric product attribute sequence, the first rate of sale, and the second rate of sale.

At block 418 of the process flow 400, a first demand score for the first clothing product identifier may be determined using the first product demand model and the first numeric product attribute sequence. For example, computer-executable instructions of one or more product attribute comparison module(s) stored at a server may be executed to determine a first demand score for the first clothing product identifier using the first product demand model and the first numeric product attribute sequence. In some instances, the first demand score may be a numeric value, although a textual value or other type of value may be used. In some embodiments, a server, such as a product attribute comparison server, may determine a first demand score for the first clothing product identifier using the first product demand model and the first numeric product attribute sequence.

At block 420 of the process flow 400, a second demand score for the second clothing product identifier may be determined using the first product demand model and the second numeric product attribute sequence. For example, computer-executable instructions of one or more product attribute comparison module(s) stored at a server may be executed to determine a second demand score for the second clothing product identifier using the first product demand model and the second numeric product attribute sequence. In some embodiments, a server, such as a product attribute comparison server, may determine a second demand score for the second clothing product identifier using the first product demand model and the second numeric product attribute sequence.

At block 422 of the process flow 400, the first clothing product identifier and the second clothing product identifier may be ranked using the first demand score and the second demand score. For example, computer-executable instructions of one or more product attribute comparison module(s) stored at a server may be executed to rank the first clothing product identifier and the second clothing product identifier using the first demand score and the second demand score. In some embodiments, a server, such as a product attribute comparison server, may rank the first clothing product identifier and the second clothing product identifier using the first demand score and the second demand score At block 424 of the process flow 400, a third textual pattern attribute value for a first test clothing product in the first clothing product category may be received. For example, computer-executable instructions of one or more product attribute comparison module(s) stored at a server may be executed to receive a third textual pattern attribute value for a first test clothing product in the first clothing product category. In some embodiments, a server, such as a product attribute comparison server, may receive a third textual pattern attribute value for a first test clothing product in the first clothing product category.

At block 426 of the process flow 400, a third textual product attribute sequence for the first test clothing product may be determined using the third textual pattern attribute value and the first product demand model, the third textual product attribute sequence including a third textual color attribute value, a third textual material attribute value, and the third textual pattern attribute value. For example, computer-executable instructions of one or more product attribute comparison module(s) stored at a server may be executed to determine a third textual product attribute sequence for the first test clothing product using the third textual pattern attribute value and the first product demand model. In some embodiments, a server, such as a product attribute comparison server, may determine a third textual product attribute sequence for the first test clothing product using the third textual pattern attribute value and the first product demand model.

At block 428 of the process flow 400, the third textual color attribute value, the third textual material attribute value, and the third textual pattern attribute value may be caused to be presented to a user. For example, computer-executable instructions of one or more product attribute comparison module(s) stored at a server may be executed to cause the third textual color attribute value, the third textual material attribute value, and the third textual pattern attribute value to be presented to a user. In some embodiments, a server, such as a product attribute comparison server, may cause the third textual color attribute value, the third textual material attribute value, and the third textual pattern attribute value to be presented to a user.

One or more operations of the method, process flows, or use cases of FIGS. 1-4 may have been described above as being performed by a user device, or more specifically, by one or more program module(s), applications, or the like executing on a device. It should be appreciated, however, that any of the operations of methods, process flows, or use cases of FIGS. 1-4 may be performed, at least in part, in a distributed manner by one or more other devices, or more specifically, by one or more program module(s), applications, or the like executing on such devices. In addition, it should be appreciated that processing performed in response to execution of computer-executable instructions provided as part of an application, program module, or the like may be interchangeably described herein as being performed by the application or the program module itself or by a device on which the application, program module, or the like is executing. While the operations of the methods, process flows, or use cases of FIGS. 1-4 may be described in the context of the illustrative devices, it should be appreciated that such operations may be implemented in connection with numerous other device configurations.

The operations described and depicted in the illustrative methods, process flows, and use cases of FIGS. 1-4 may be carried out or performed in any suitable order, such as the depicted orders, as desired in various example embodiments of the disclosure. Additionally, in certain example embodiments, at least a portion of the operations may be carried out in parallel. Furthermore, in certain example embodiments, less, more, or different operations than those depicted in FIGS. 1-4 may be performed.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Certain aspects of the disclosure are described above with reference to block and flow diagrams of systems, methods, apparatuses, and/or computer program products according to example embodiments. It will be understood that one or more blocks of the block diagrams and flow diagrams, and combinations of blocks in the block diagrams and the flow diagrams, respectively, may be implemented by execution of computer-executable program instructions. Likewise, some blocks of the block diagrams and flow diagrams may not necessarily need to be performed in the order presented, or may not necessarily need to be performed at all, according to some embodiments. Further, additional components and/or operations beyond those depicted in blocks of the block and/or flow diagrams may be present in certain embodiments.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Illustrative Computer Architecture

Figure 5:
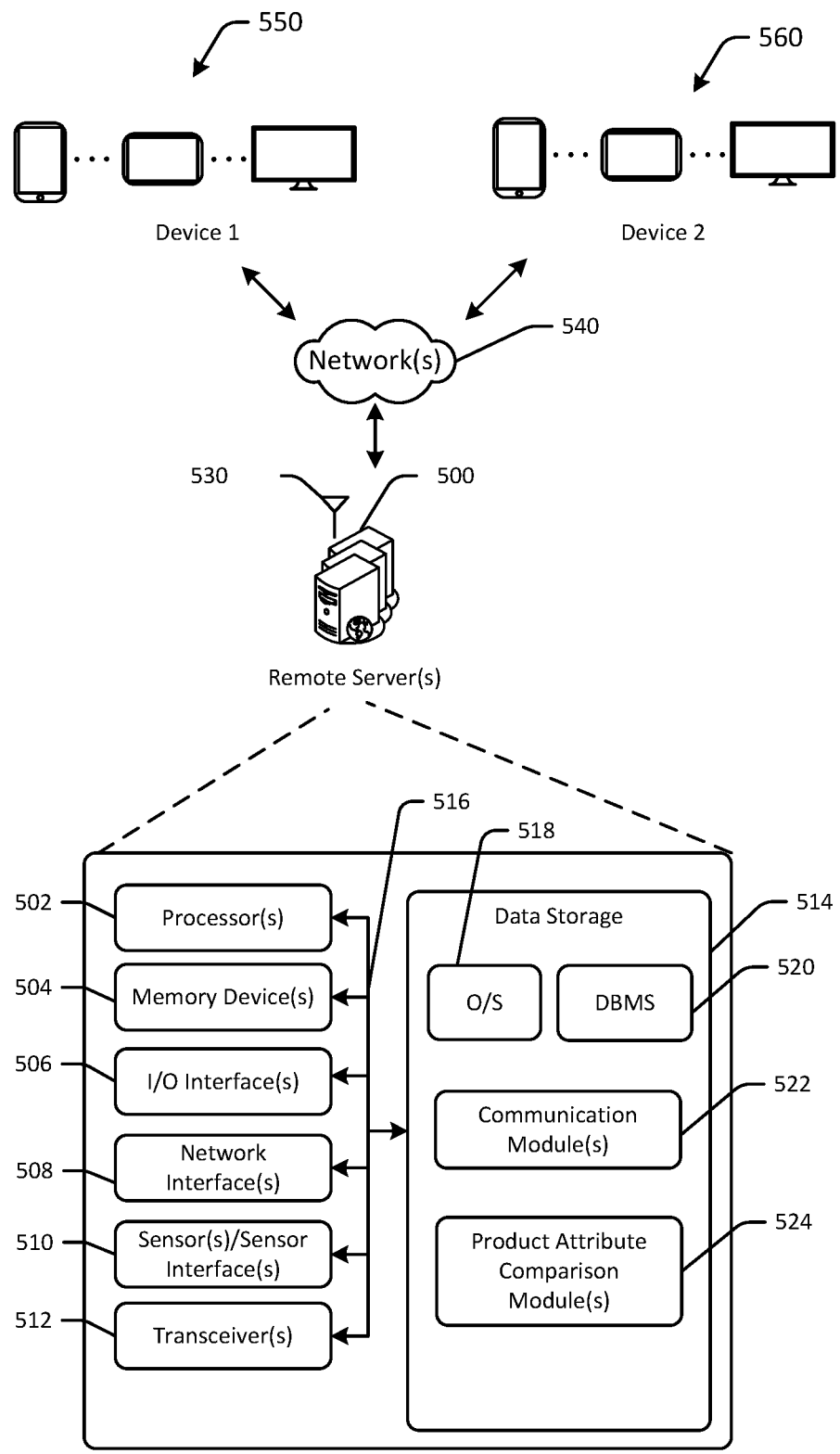
FIG. 5 schematically illustrates an example architecture of a system in accordance with one or more embodiments of the disclosure.

FIG. 5 is a schematic block diagram of one or more illustrative remote server(s) 500 in accordance with one or more example embodiments of the disclosure. The remote server(s) 500 may include any suitable computing device including, but not limited to, a server system, a mobile device such as a smartphone, a tablet, an e-reader, a wearable device, or the like; a desktop computer; a laptop computer; a content streaming device; a set-top box; or the like. The remote server(s) 500 may correspond to an illustrative device configuration for the product attribute comparison server(s) of FIGS. 1-5.

The remote server(s) 500 may be configured to communicate via one or more networks with one or more servers, user devices, or the like. The remote server(s) 500 may be configured to generate one or more machine learning algorithms, artificial intelligence models, determine respective inputs and outputs of algorithms and models, cause one or more orders for physical goods to be submitted and/or fulfilled, and other operations. The remote server(s) 500 may be configured to deliver or cause delivery of instructions and/or one or more pieces of content and may further be configured to determine predicted performance of a product associated with a product category via at least determining a textual product attribute value for the product, determining a product demand model for the product category, determining a numeric product attribute sequence for the product using the textual product attribute value and the product demand model, and determining a textual product attribute sequence for the product using the numeric product attribute sequence. In some embodiments, a single remote server or single group of remote servers may be configured to perform more than one type of content delivery functionality.

The remote server(s) 500 may be configured to communicate via one or more networks 540. Such network(s) 540 may include, but are not limited to, any one or more different types of communications networks such as, for example, cable networks, public networks (e.g., the Internet), private networks (e.g., frame-relay networks), wireless networks, cellular networks, telephone networks (e.g., a public switched telephone network), or any other suitable private or public packet-switched or circuit-switched networks. Further, such network(s) 540 may have any suitable communication range associated therewith and may include, for example, global networks (e.g., the Internet), metropolitan area networks (MANs), wide area networks (WANs), local area networks (LANs), or personal area networks (PANs). In addition, such network(s) 540 may include communication links and associated networking devices (e.g., link-layer switches, routers, etc.) for transmitting network traffic over any suitable type of medium including, but not limited to, coaxial cable, twisted-pair wire (e.g., twisted-pair copper wire), optical fiber, a hybrid fiber-coaxial (HFC) medium, a microwave medium, a radio frequency communication medium, a satellite communication medium, or any combination thereof.

In FIG. 5, the remote server(s) 500 may communicate with one or more user devices via the network(s) 540. For example, the remote server(s) 500 may communicate with a first user device 550 via the network(s) 540 when the first user device 550 is connected to the network(s) 540. Likewise, the remote server(s) 500 may communicate with a second user device 560 via the network(s) 540 when the second user device 560 is connected to the network(s) 540. The remote server(s) 500 may communicate with any number of semi-connected devices.

In an illustrative configuration, the remote server(s) 500 may include one or more processors (processor(s)) 502, one or more memory devices 504 (also referred to herein as memory 504), one or more input/output (I/O) interface(s) 506, one or more network interface(s) 508, one or more sensors or sensor interface(s) 510, one or more transceivers 512, and data storage 514. The remote server(s) 500 may further include one or more buses 516 that functionally couple various components of the remote server(s) 500. The remote server(s) 500 may further include one or more antenna(e) 530 that may include, without limitation, a cellular antenna for transmitting or receiving signals to/from a cellular network infrastructure, an antenna for transmitting or receiving Wi-Fi signals to/from an access point (AP), a Global Navigation Satellite System (GNSS) antenna for receiving GNSS signals from a GNSS satellite, a Bluetooth antenna for transmitting or receiving Bluetooth signals, a Near Field Communication (NFC) antenna for transmitting or receiving NFC signals, and so forth. These various components will be described in more detail hereinafter.

The bus(es) 516 may include at least one of a system bus, a memory bus, an address bus, or a message bus, and may permit the exchange of information (e.g., data (including computer-executable code), signaling, etc.) between various components of the remote server(s) 500. The bus(es) 516 may include, without limitation, a memory bus or a memory controller, a peripheral bus, an accelerated graphics port, and so forth. The bus(es) 516 may be associated with any suitable bus architecture including, without limitation, an Industry Standard Architecture (ISA), a Micro Channel Architecture (MCA), an Enhanced ISA (EISA), a Video Electronics Standards Association (VESA) architecture, an Accelerated Graphics Port (AGP) architecture, a Peripheral Component Interconnects (PCI) architecture, a PCI-Express architecture, a Personal Computer Memory Card International Association (PCMCIA) architecture, a Universal Serial Bus (USB) architecture, and so forth.

The memory 504 of the remote server(s) 500 may include volatile memory (memory that maintains its state when supplied with power) such as random access memory (RAM) and/or non-volatile memory (memory that maintains its state even when not supplied with power) such as read-only memory (ROM), flash memory, ferroelectric RAM (FRAM), and so forth. Persistent data storage, as that term is used herein, may include non-volatile memory. In certain example embodiments, volatile memory may enable faster read/write access than non-volatile memory. However, in certain other example embodiments, certain types of non-volatile memory (e.g., FRAM) may enable faster read/write access than certain types of volatile memory.

In various implementations, the memory 504 may include multiple different types of memory such as various types of static random access memory (SRAM), various types of dynamic random access memory (DRAM), various types of unalterable ROM, and/or writeable variants of ROM such as electrically erasable programmable read-only memory (EEPROM), flash memory, and so forth. The memory 504 may include main memory as well as various forms of cache memory such as instruction cache(s), data cache(s), translation lookaside buffer(s) (TLBs), and so forth. Further, cache memory such as a data cache may be a multi-level cache organized as a hierarchy of one or more cache levels (L1, L2, etc.).

The data storage 514 may include removable storage and/or non-removable storage including, but not limited to, magnetic storage, optical disk storage, and/or tape storage. The data storage 514 may provide non-volatile storage of computer-executable instructions and other data. The memory 504 and the data storage 514, removable and/or non-removable, are examples of computer-readable storage media (CRSM) as that term is used herein.

The data storage 514 may store computer-executable code, instructions, or the like that may be loadable into the memory 504 and executable by the processor(s) 502 to cause the processor(s) 502 to perform or initiate various operations. The data storage 514 may additionally store data that may be copied to the memory 504 for use by the processor(s) 502 during the execution of the computer-executable instructions. Moreover, output data generated as a result of execution of the computer-executable instructions by the processor(s) 502 may be stored initially in the memory 504, and may ultimately be copied to data storage 514 for non-volatile storage.

More specifically, the data storage 514 may store one or more operating systems (O/S) 518; one or more database management systems (DBMS) 520; and one or more program module(s), applications, engines, computer-executable code, scripts, or the like such as, for example, one or more communication module(s) 522 and/or one or more product attribute comparison module(s) 524. Some or all of these module(s) may be or include sub-module(s). Any of the components depicted as being stored in data storage 514 may include any combination of software, firmware, and/or hardware. The software and/or firmware may include computer-executable code, instructions, or the like that may be loaded into the memory 504 for execution by one or more of the processor(s) 502. Any of the components depicted as being stored in data storage 514 may support the functionality described in reference to the corresponding components named earlier in this disclosure.

The data storage 514 may further store various types of data utilized by the components of the remote server(s) 500. Any data stored in the data storage 514 may be loaded into the memory 504 for use by the processor(s) 502 in executing computer-executable code. In addition, any data depicted as being stored in the data storage 514 may potentially be stored in one or more datastore(s) and may be accessed via the DBMS 520 and loaded in the memory 504 for use by the processor(s) 502 in executing computer-executable code. The datastore(s) may include, but are not limited to, databases (e.g., relational, object-oriented, etc.), file systems, flat files, distributed datastores in which data is stored on more than one node of a computer network, peer-to-peer network datastores, or the like. In FIG. 5, an example datastore(s) may include, for example, product information for one or more products, one or more product attribute conversion tools for converting between textual product attribute values and numeric product attribute values, historical data relating to product sales, one or more product demand models for determining predicted product performance and/or other information.

The processor(s) 502 may be configured to access the memory 504 and execute computer-executable instructions loaded therein. For example, the processor(s) 502 may be configured to execute computer-executable instructions of the various program module(s), applications, engines, or the like of the remote server(s) 500 to cause or facilitate various operations to be performed in accordance with one or more embodiments of the disclosure. The processor(s) 502 may include any suitable processing unit capable of accepting data as input, processing the input data in accordance with stored computer-executable instructions, and generating output data. The processor(s) 502 may include any type of suitable processing unit including, but not limited to, a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), a digital signal processor (DSP), and so forth. Further, the processor(s) 502 may have any suitable microarchitecture design that includes any number of constituent components such as, for example, registers, multiplexers, arithmetic logic units, cache controllers for controlling read/write operations to cache memory, branch predictors, or the like. The microarchitecture design of the processor(s) 502 may be capable of supporting any of a variety of instruction sets.

Referring now to functionality supported by the various program module(s) depicted in FIG. 5, the communication module(s) 522 may include computer-executable instructions, code, or the like that responsive to execution by one or more of the processor(s) 502 may perform functions including, but not limited to, communicating with remote servers, communicating with remote datastores, communicating with user devices, sending or receiving information and instructions, and the like.

The product attribute comparison module(s) 524 may include computer-executable instructions, code, or the like that responsive to execution by one or more of the processor(s) 502 may perform functions including, but not limited to, determining a textual product attribute value for a product associated with a product category, determining a product demand model for the product category, determining a numeric product attribute sequence for the product using the textual product attribute value and the product demand model, and determining a textual product attribute sequence for the product using the numeric product attribute sequence, and the like.

Referring now to other illustrative components depicted as being stored in the data storage 514, the O/S 518 may be loaded from the data storage 514 into the memory 504 and may provide an interface between other application software executing on the remote server(s) 500 and the hardware resources of the remote server(s) 500. More specifically, the O/S 518 may include a set of computer-executable instructions for managing the hardware resources of the remote server(s) 500 and for providing common services to other application programs (e.g., managing memory allocation among various application programs). In certain example embodiments, the O/S 518 may control execution of the other program module(s) to dynamically enhance characters for content rendering. The O/S 518 may include any operating system now known or which may be developed in the future including, but not limited to, any server operating system, any mainframe operating system, or any other proprietary or non-proprietary operating system.

The DBMS 520 may be loaded into the memory 504 and may support functionality for accessing, retrieving, storing, and/or manipulating data stored in the memory 504 and/or data stored in the data storage 514. The DBMS 520 may use any of a variety of database models (e.g., relational model, object model, etc.) and may support any of a variety of query languages. The DBMS 520 may access data represented in one or more data schemas and stored in any suitable data repository including, but not limited to, databases (e.g., relational, object-oriented, etc.), file systems, flat files, distributed datastores in which data is stored on more than one node of a computer network, peer-to-peer network datastores, or the like. In those example embodiments in which the remote server(s) 500 is a mobile device, the DBMS 520 may be any suitable light-weight DBMS optimized for performance on a mobile device.

Referring now to other illustrative components of the remote server(s) 500, the input/output (I/O) interface(s) 506 may facilitate the receipt of input information by the remote server(s) 500 from one or more I/O devices as well as the output of information from the remote server(s) 500 to the one or more I/O devices. The I/O devices may include any of a variety of components such as a display or display screen having a touch surface or touchscreen; an audio output device for producing sound, such as a speaker; an audio capture device, such as a microphone; an image and/or video capture device, such as a camera; a haptic unit; and so forth. Any of these components may be integrated into the remote server(s) 500 or may be separate. The I/O devices may further include, for example, any number of peripheral devices such as data storage devices, printing devices, and so forth.

The I/O interface(s) 506 may also include an interface for an external peripheral device connection such as universal serial bus (USB), FireWire, Thunderbolt, Ethernet port or other connection protocol that may connect to one or more networks. The I/O interface(s) 506 may also include a connection to one or more of the antenna(e) 530 to connect to one or more networks via a wireless local area network (WLAN) (such as Wi-Fi) radio, Bluetooth, and/or a wireless network radio, such as a radio capable of communication with a wireless communication network such as a Long Term Evolution (LTE) network, a WiMAX network, a 3G network, etc.

The remote server(s) 500 may further include one or more network interface(s) 508 via which the remote server(s) 500 may communicate with any of a variety of other systems, platforms, networks, devices, and so forth. The network interface(s) 508 may enable communication, for example, with one or more wireless routers, one or more host servers, one or more web servers, and the like via one or more networks.

The antenna(e) 530 may include any suitable type of antenna depending, for example, on the communications protocols used to transmit or receive signals via the antenna (e) 530. Non-limiting examples of suitable antennae may include directional antennae, non-directional antennae, dipole antennae, folded dipole antennae, patch antennae, multiple-input multiple-output (MIMO) antennae, or the like. The antenna(e) 530 may be communicatively coupled to one or more transceivers 512 or radio components to which or from which signals may be transmitted or received.

As previously described, the antenna(e) 530 may include a cellular antenna configured to transmit or receive signals in accordance with established standards and protocols, such as Global System for Mobile Communications (GSM), 3G standards (e.g., Universal Mobile Telecommunications System (UMTS), Wideband Code Division Multiple Access (W-CDMA), CDMA2000, etc.), 4G standards (e.g., Long-Term Evolution (LTE), WiMax, etc.), direct satellite communications, or the like.

The antenna(e) 530 may additionally, or alternatively, include a Wi-Fi antenna configured to transmit or receive signals in accordance with established standards and protocols, such as the IEEE 802.11 family of standards, including via 2.4 GHz channels (e.g., 802.11b, 802.11g, 802.11n), 5 GHz channels (e.g., 802.11n, 802.11ac), or 60 GHz channels (e.g., 802.11ad). In alternative example embodiments, the antenna(e) 530 may be configured to transmit or receive radio frequency signals within any suitable frequency range forming part of the unlicensed portion of the radio spectrum.

The antenna(e) 530 may additionally, or alternatively, include a GNSS antenna configured to receive GNSS signals from three or more GNSS satellites carrying time-position information to triangulate a position therefrom. Such a GNSS antenna may be configured to receive GNSS signals from any current or planned GNSS such as, for example, the Global Positioning System (GPS), the GLONASS System, the Compass Navigation System, the Galileo System, or the Indian Regional Navigational System.

The transceiver(s) 512 may include any suitable radio component(s) for—in cooperation with the antenna(e) 530—transmitting or receiving radio frequency (RF) signals in the bandwidth and/or channels corresponding to the communications protocols utilized by the remote server(s) 500 to communicate with other devices. The transceiver(s) 512 may include hardware, software, and/or firmware for modulating, transmitting, or receiving—potentially in cooperation with any of antenna(e) 530—communications signals according to any of the communications protocols discussed above including, but not limited to, one or more Wi-Fi and/or Wi-Fi direct protocols, as standardized by the IEEE 1002.11 standards, one or more non-Wi-Fi protocols, or one or more cellular communications protocols or standards. The transceiver(s) 512 may further include hardware, firmware, or software for receiving GNSS signals. The transceiver(s) 512 may include any known receiver and baseband suitable for communicating via the communications protocols utilized by the remote server(s) 500. The transceiver(s) 512 may further include a low noise amplifier (LNA), additional signal amplifiers, an analog-to-digital (A/D) converter, one or more buffers, a digital baseband, or the like.

The sensor(s)/sensor interface(s) 510 may include or may be capable of interfacing with any suitable type of sensing device such as, for example, inertial sensors, force sensors, thermal sensors, and so forth. Example types of inertial sensors may include accelerometers (e.g., MEMS-based accelerometers), gyroscopes, and so forth.

It should be appreciated that the program module(s), applications, computer-executable instructions, code, or the like depicted in FIG. 5 as being stored in the data storage 514 are merely illustrative and not exhaustive and that the processing described as being supported by any particular module may alternatively be distributed across multiple module(s) or performed by a different module. In addition, various program module(s), script(s), plug-in(s), Application Programming Interface(s) (API(s)), or any other suitable computer-executable code hosted locally on the remote server(s) 500, and/or hosted on other computing device(s) accessible via one or more networks, may be provided to support the functionality provided by the program module(s), applications, or computer-executable code depicted in FIG. 5 and/or additional or alternate functionality. Further, functionality may be modularized differently such that processing described as being supported collectively by the collection of program module(s) depicted in FIG. 5 may be performed by a fewer or greater number of module(s), or functionality described as being supported by any particular module may be supported, at least in part, by another module. In addition, program module(s) that support the functionality described herein may form part of one or more applications executable across any number of systems or devices in accordance with any suitable computing model such as, for example, a client-server model, a peer-to-peer model, and so forth. In addition, any of the functionality described as being supported by any of the program module(s) depicted in FIG. 5 may be implemented, at least partially, in hardware and/or firmware across any number of devices.

It should further be appreciated that the remote server(s) 500 may include alternate and/or additional hardware, software, or firmware components beyond those described or depicted without departing from the scope of the disclosure. More particularly, it should be appreciated that software, firmware, or hardware components depicted as forming part of the remote server(s) 500 are merely illustrative and that some components may not be present or additional components may be provided in various embodiments. While various illustrative program module(s) have been depicted and described as software module(s) stored in the data storage 514, it should be appreciated that the functionality described as being supported by the program module(s) may be enabled by any combination of hardware, software, and/or firmware. It should further be appreciated that each of the above-mentioned module(s) may, in various embodiments, represent a logical partitioning of supported functionality. This logical partitioning is depicted for ease of explanation of the functionality and may not be representative of the structure of software, hardware, and/or firmware for implementing the functionality. Accordingly, it should be appreciated that functionality described as being provided by a particular module may, in various embodiments, be provided at least in part by one or more other module(s). Further, one or more depicted module(s) may not be present in certain embodiments, while in other embodiments, additional module(s) not depicted may be present and may support at least a portion of the described functionality and/or additional functionality. Moreover, while certain module(s) may be depicted and described as sub-module(s) of another module, in certain embodiments, such module(s) may be provided as independent module(s) or as sub-module(s) of other module(s).

Certain aspects of the disclosure are described above with reference to block and flow diagrams of systems, methods, apparatuses, and/or computer program products according to example embodiments. It will be understood that one or more blocks of the block diagrams and flow diagrams, and combinations of blocks in the block diagrams and the flow diagrams, respectively, may be implemented by execution of computer-executable program instructions. Likewise, some blocks of the block diagrams and flow diagrams may not necessarily need to be performed in the order presented, or may not necessarily need to be performed at all, according to some embodiments. Further, additional components and/or operations beyond those depicted in blocks of the block and/or flow diagrams may be present in certain embodiments.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Program module(s), applications, or the like disclosed herein may include one or more software components including, for example, software objects, methods, data structures, or the like. Each such software component may include computer-executable instructions that, responsive to execution, cause at least a portion of the functionality described herein (e.g., one or more operations of the illustrative methods described herein) to be performed.

A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform.

Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, or a report writing language. In one or more example embodiments, a software component comprising instructions in one of the foregoing examples of programming languages may be executed directly by an operating system or other software component without having to be first transformed into another form.

A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

Software components may invoke or be invoked by other software components through any of a wide variety of mechanisms. Invoked or invoking software components may comprise other custom-developed application software, operating system functionality (e.g., device drivers, data storage (e.g., file management) routines, other common routines and services, etc.), or third-party software components (e.g., middleware, encryption, or other security software, database management software, file transfer or other network communication software, mathematical or statistical software, image processing software, and format translation software).

Software components associated with a particular solution or system may reside and be executed on a single platform or may be distributed across multiple platforms. The multiple platforms may be associated with more than one hardware vendor, underlying chip technology, or operating system. Furthermore, software components associated with a particular solution or system may be initially written in one or more programming languages, but may invoke software components written in another programming language.

Computer-executable program instructions may be loaded onto a special-purpose computer or other particular machine, a processor, or other programmable data processing apparatus to produce a particular machine, such that execution of the instructions on the computer, processor, or other programmable data processing apparatus causes one or more functions or operations specified in the flow diagrams to be performed. These computer program instructions may also be stored in a computer-readable storage medium (CRSM) that upon execution may direct a computer or other programmable data processing apparatus to function in a particular manner, such that the instructions stored in the computer-readable storage medium produce an article of manufacture including instruction means that implement one or more functions or operations specified in the flow diagrams. The computer program instructions may also be loaded onto a computer or other programmable data processing apparatus to cause a series of operational elements or steps to be performed on the computer or other programmable apparatus to produce a computer-implemented process.

Additional types of CRSM that may be present in any of the devices described herein may include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile disc (DVD) or other optical storage, magnetic cassettes, magnetic tape, magnetic disk storage or other magnetic storage devices, or any other medium which can be used to store the information and which can be accessed. Combinations of any of the above are also included within the scope of CRSM. Alternatively, computer-readable communication media (CRCM) may include computer-readable instructions, program module(s), or other data transmitted within a data signal, such as a carrier wave, or other transmission. However, as used herein, CRSM does not include CRCM.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment. The term "based at least in part on" and "based on" are synonymous terms which may be used interchangeably herein.

That which is claimed is:

1. A method comprising:
   determining, by one or more computer processors coupled to at least one memory, a training set of clothing product data associated with a first clothing product category, the training set comprising a first clothing product identifier and a second clothing product identifier;
   determining a first textual product attribute sequence for the first clothing product identifier, the first textual product attribute sequence comprising a first textual color attribute value, a first textual material attribute value, and a first textual pattern attribute value;
   converting the first textual product attribute sequence to a first numeric product attribute sequence for the first clothing product identifier, the first numeric product attribute sequence comprising a first numeric color attribute value, a first numeric material attribute value, and a first numeric pattern attribute value;
   determining a first rate of sale of the first clothing product identifier over a first time period;
   determining a second textual product attribute sequence for the second clothing product identifier, the second textual product attribute sequence comprising a second textual color attribute value, a second textual material attribute value, and a second textual pattern attribute value;
   converting the second textual product attribute sequence to a second numeric product attribute sequence for the second clothing product identifier, the second numeric product attribute sequence comprising a second numeric color attribute value, a second numeric material attribute value, and a second numeric pattern attribute value;
   determining a second rate of sale of the second clothing product identifier over the first time period;
   generating a first product demand model for the first clothing product category using the first numeric product attribute sequence, the second numeric product attribute sequence, the first rate of sale, and the second rate of sale, the first product demand model comprising at least one algorithm;

determining a first demand score for the first clothing product identifier using the first product demand model and the first numeric product attribute sequence;

determining a second demand score for the second clothing product identifier using the first product demand model and the second numeric product attribute sequence;

ranking the first clothing product identifier and the second clothing product identifier using the first demand score and the second demand score;

receiving a third textual pattern attribute value for a first test clothing product in the first clothing product category;

determining a third textual product attribute sequence for the first test clothing product using the third textual pattern attribute value and the first product demand model, the third textual product attribute sequence comprising a third textual color attribute value, a third textual material attribute value, and the third textual pattern attribute value; and causing the third textual color attribute value, the third textual material attribute value, and the third textual pattern attribute value to be presented to a user.

2. The method of claim 1, further comprising:

converting the third textual product attribute sequence to a third numeric product attribute sequence for the first test clothing product, the third numeric product attribute sequence comprising a third numeric color attribute value, a third numeric material attribute value, and a third numeric pattern attribute value;

determining an estimated demand score for the first test clothing product using the first product demand model and the third numeric product attribute sequence; and causing the estimated demand score to be presented to the user.

3. The method of claim 1, further comprising:

converting the third textual product attribute sequence to a third numeric product attribute sequence for the first test clothing product, the third numeric product attribute sequence comprising a third numeric color attribute value, a third numeric material attribute value, and a third numeric pattern attribute value;

determining a third rate of sale of the first test clothing product over a second time period; and generating a second product demand model for the first clothing product category using the third numeric product attribute sequence and the third rate of sale.

4. The method of claim 1, further comprising:

receiving a fourth textual product attribute sequence for a second test clothing product in the first clothing product category, the fourth textual product attribute sequence comprising a fourth textual color attribute value, a fourth textual material attribute value, and a fourth textual pattern attribute value provided by a user;

converting the fourth textual product attribute sequence to a third numeric product attribute sequence for the second test clothing product, the fourth numeric product attribute sequence comprising a third numeric color attribute value, a third numeric material attribute value, and a third numeric pattern attribute value;

determining an estimated demand score for the second test clothing product using the first product demand model and the third numeric product attribute sequence; and causing the estimated demand score to be presented to the user.

5. A method comprising:

determining, by one or more computer processors coupled to at least one memory, a first textual product attribute value for a first product for which to predict product performance, the first product associated with a first product category;

determining a first numeric product attribute sequence for the first product using the first textual product attribute value and a first product demand model, the first numeric product attribute sequence comprising a first numeric product attribute value and a second numeric product attribute value;

determining a first textual product attribute sequence for the first product using the first numeric product attribute sequence, the first textual product attribute sequence comprising the first textual product attribute value and a second textual product attribute value;

determining a training set of product data associated with the first product category, the training set comprising a first product identifier and a second product identifier;

determining a second textual product attribute sequence for the first product identifier, the second textual product attribute sequence comprising a third textual product attribute value and a fourth textual product attribute value;

determining a second numeric product attribute sequence for the first product identifier using the second textual product attribute sequence, the second numeric product attribute sequence comprising a third numeric product attribute value and a fourth numeric product attribute value;

determining a first rate of sale of the first product identifier over a time period;

determining a third textual product attribute sequence for the second product identifier, the third textual product attribute sequence comprising a fifth textual product attribute value and a sixth textual product attribute value;

determining a third numeric product attribute sequence for the second product identifier using the third textual product attribute sequence, the third numeric product attribute sequence comprising a fifth numeric product attribute value and a sixth numeric product attribute value;

determining a second rate of sale of the second product identifier over the time period; and generating the first product demand model for the first product category using the second numeric product attribute sequence, the first product demand model comprising at least one algorithm configured to output predicted product performance.

6. The method of claim 5, further comprising:

determining an estimated demand score for the first product using the first product demand model and the first numeric product attribute sequence.

7. The method of claim 6, further comprising:

determining an estimated rate of sale of the first product over a time period using the estimated demand score and the first product demand model.

8. The method of claim 5, further comprising:

generating a second product demand model for the first product category using the first numeric product attribute sequence and the rate of sale.

9. The method of claim 5, further comprising:
- determining a fifth textual product attribute value and a sixth textual product attribute value for a second product for which to predict product performance, the second product associated with the first product category; and
- determining a third textual product attribute sequence for the second product using the fifth textual product attribute value, the sixth textual product attribute value, and the first product demand model, the third textual product attribute sequence comprising the fifth textual product attribute value, the sixth textual product attribute value, and a seventh textual product attribute value.

10. The method of claim 5, wherein generating the first product demand model for the first product category using the second numeric product attribute sequence comprises generating the first product demand model using the second numeric product attribute sequence, the third numeric product attribute sequence, the first rate of sale, and the second rate of sale.

11. The method of claim 10, wherein generating the first product demand model for the first product category using the second numeric product attribute sequence, the third numeric product attribute sequence, the first rate of sale, and the second rate of sale comprises weighting the second numeric product attribute sequence using the first rate of sale, and weighting the third numeric product attribute sequence using the second rate of sale.

12. The method of claim 10, further comprising:
- determining a first demand score for the first product identifier using the first product demand model and the second numeric product attribute sequence; and
- determining a second demand score for the second product identifier using the first product demand model and the third numeric product attribute sequence.

13. The method of claim 12, further comprising:
- determining a first rank value of the first product identifier using the first demand score and the second demand score;
- determining a second rank value of the second product identifier using the first demand score and the second demand score; and
- determining that the first rank is greater than the second rank.

14. The method of claim 5, further comprising:
- determining a fifth textual product attribute value for a second product for which to predict product performance, the second product associated with a second product category;
- determining a second product demand model for the second product category, the second product demand model comprising at least one algorithm configured to output predicted product performance; and
- determining a third textual product attribute sequence for the second product using the fifth textual product attribute value and the second product demand model, the second textual product attribute sequence comprising the fifth textual product attribute value and a sixth textual product attribute value.

15. The method of claim 5, wherein:
the first product is a clothing product; and
the first textual product attribute value comprises one of a color of the clothing product, a closure type of the clothing product, a sleeve type of the clothing product, a collar type of the clothing product, a material of the clothing product, a style name of the clothing product, a fit type of the clothing product, or a pattern type of the clothing product.

16. The method of claim 5, further comprising:
causing the first textual product attribute value and the second textual product attribute value to be presented at a display device.

17. A device comprising:
at least one memory that stores computer-executable instructions; and
at least one processor configured to access the at least one memory and execute the computer-executable instructions to:
- determine a first textual product attribute value for a first product for which to predict product performance, the first product associated with a first product category;
- determine a first product demand model for the first product category, the first product demand model comprising at least one algorithm configured to output predicted product performance;
- determine a first numeric product attribute sequence for the first product using the first textual product attribute value and the first product demand model, the first numeric product attribute sequence comprising a first numeric product attribute value and a second numeric product attribute value;
- determine a first textual product attribute sequence for the first product using the first numeric product attribute sequence, the first textual product attribute sequence comprising the first textual product attribute value and a second textual product attribute value;
- determine a training set of product data associated with the first product category, the training set comprising a first product identifier and a second product identifier;
- determine a second textual product attribute sequence for the first product identifier, the second textual product attribute sequence comprising a third textual product attribute value and a fourth textual product attribute value;
- determine a second numeric product attribute sequence for the first product identifier using the second textual product attribute sequence, the second numeric product attribute sequence comprising a third numeric product attribute value and a fourth numeric product attribute value;
- determine a first rate of sale of the first product identifier over a time period;
- determine a third textual product attribute sequence for the second product identifier, the third textual product attribute sequence comprising a fifth textual product attribute value and a sixth textual product attribute value;
- determine a third numeric product attribute sequence for the second product identifier using the third textual product attribute sequence, the third numeric product attribute sequence comprising a fifth numeric product attribute value and a sixth numeric product attribute value;
- determine a second rate of sale of the second product identifier over the time period; and
- generate the first product demand model for the first product category using the second numeric product attribute sequence, the first product demand model comprising at least one algorithm configured to output predicted product performance.

18. The device of claim 17, wherein the at least one processor is further configured to access the at least one memory and execute the computer-executable instructions to:
   determine an estimated demand score for the first product using the first product demand model and the first numeric product attribute sequence.

19. The device of claim 17, wherein the at least one processor is further configured to access the at least one memory and execute the computer-executable instructions to:
   determine a second product demand model for the first product category using the first numeric product attribute sequence and the rate of sale.

20. The device of claim 17, wherein the at least one processor is further configured to access the at least one memory and execute the computer-executable instructions to:
   determine a fifth textual product attribute value and a sixth textual product attribute value for a second product for which to predict product performance, the second product associated with the first product category; and
   determine a third textual product attribute sequence for the second product using the fifth textual product attribute value, the sixth textual product attribute value, and the first product demand model, the third textual product attribute sequence comprising the fifth textual product attribute value, the sixth textual product attribute value, and a seventh textual product attribute value.

21. A method comprising:
   determining, by one or more computer processors coupled to memory, a first textual product attribute value for a test product for which to predict product performance;
   determining a first numeric product attribute sequence for the test product using the first textual product attribute value and a first product demand model;
   determining a first textual product attribute sequence for the test product using the first textual product attribute value;
   determining a second textual product attribute sequence for the test product, the second textual product attribute sequence comprising a second textual product attribute value and a third textual product attribute value;
   determining a second numeric product attribute sequence for the test product using the second textual product attribute sequence;
   determining a product category associated with the test product;
   generating a product demand model for the product category using the second numeric product attribute sequence, the product demand model comprising at least one algorithm configured to output predicted product performance, wherein the product demand model is trained using a training set comprising product identifiers and corresponding predicted performance values; and
   determining, using the product demand model, an estimated demand score for the test product, wherein the estimated demand score is indicative of a predicted performance value of the test product relative to the predicted performance values of the product identifiers of the training set.

22. The method of claim 21, further comprising:
   determining the training set of product identifiers for the product category;
   determining textual product attribute sequences for each product identifier of the training set;
   determining numeric product attribute sequences for each product identifier of the training set; and
   determining a rate of sale of each product identifier of the training set over a time period.

* * * * *